(12) United States Patent
Baba

(10) Patent No.: US 9,367,043 B2
(45) Date of Patent: Jun. 14, 2016

(54) SATELLITE SIGNAL RECEIVING DEVICE, METHOD OF CONTROLLING SATELLITE SIGNAL RECEIVING DEVICE, AND ELECTRONIC DEVICE

(75) Inventor: Norimitsu Baba, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 897 days.

(21) Appl. No.: 13/351,961

(22) Filed: Jan. 17, 2012

(65) Prior Publication Data

US 2012/0188123 A1 Jul. 26, 2012

(30) Foreign Application Priority Data

Jan. 20, 2011 (JP) .................................. 2011-009925
Jan. 20, 2011 (JP) .................................. 2011-009926

(51) Int. Cl.
*G04R 20/04* (2013.01)
*G04C 10/02* (2006.01)
*G01S 19/26* (2010.01)
*G01S 19/34* (2010.01)

(52) U.S. Cl.
CPC ................. *G04R 20/04* (2013.01); *G01S 19/26* (2013.01); *G01S 19/34* (2013.01); *G04C 10/02* (2013.01)

(58) Field of Classification Search
CPC ......... G01S 19/34; G01S 19/26; G01S 19/14; G01S 19/23; G01S 19/24; G02R 20/02; G02R 20/04; G02R 20/06; G04R 20/02; G04R 20/04; G04R 20/06; G04C 10/02

USPC ............. 342/357.74, 357.65, 357.52, 357.62, 342/357.63; 368/14, 47

See application file for complete search history.

(56) References Cited

U.S. PATENT DOCUMENTS

| | | | |
|---|---|---|---|
| 5,898,643 A | 4/1999 | Yasuoka et al. | |
| 7,616,153 B2 * | 11/2009 | Honda et al. ............. | 342/357.74 |
| 2006/0114151 A1 * | 6/2006 | Iwami ...................... | 342/357.06 |
| 2008/0030403 A1 | 2/2008 | Honda et al. | |
| 2009/0135674 A1 | 5/2009 | Matsuzaki | |
| 2010/0220555 A1 * | 9/2010 | Honda ............................ | 368/14 |

FOREIGN PATENT DOCUMENTS

| | | |
|---|---|---|
| JP | 2004-069679 A | 3/2004 |
| JP | 2008-039565 A | 2/2008 |
| WO | 97/21153 A1 | 6/1997 |

* cited by examiner

*Primary Examiner* — Cassie Galt

(57) ABSTRACT

A solar cell, a charge state detection circuit and a voltage detection circuit as a generating state detection circuit that detects the generating state of the solar cell, and a control circuit are provided. The control circuit operates a GPS receiver circuit when a detection value detected by the voltage detection circuit is greater than or equal to a preset threshold value, and resets the threshold value if satellite signal reception by the GPS receiver circuit fails, or if the detection value detected by the voltage detection circuit remains less than the threshold value for a preset generating state detection time or longer.

13 Claims, 16 Drawing Sheets

| DETECTION LEVEL | OPEN CIRCUIT VOLTAGE OF SOLAR CELL (V) | ILLUMINANCE (lx) |
|---|---|---|
| 0 | 3.8 | 100 |
| 1 | 4.4 | 500 |
| 2 | 4.8 | 1,000 |
| 3 | 5.0 | 2,000 |
| 4 | 5.2 | 3,000 |
| 5 | 5.4 | 5,000 |
| 6 | 5.5 | 8,000 |
| 7 | 5.6 | 10,000 |
| 8 | 5.8 | 30,000 |
| 9 | 5.9 | 50,000 |
| 10 | 6.2 | 100,000 |

FIG. 8

| DETECTION LEVEL | OPEN CIRCUIT VOLTAGE OF SOLAR CELL (V) | DAYS USED (0 - 249) ILLUMINANCE (lx) | DAYS USED (250 - 499) ILLUMINANCE (lx) | DAYS USED (500 - 999) ILLUMINANCE (lx) | DAYS USED (1000 or more) ILLUMINANCE (lx) |
|---|---|---|---|---|---|
| 0 | 3.8 | 100 | 160 | 220 | 300 |
| 1 | 4.4 | 500 | 800 | 1,100 | 1,500 |
| 2 | 4.8 | 1,000 | 1,600 | 2,200 | 3,000 |
| 3 | 5.0 | 2,000 | 3,200 | 4,400 | 6,000 |
| 4 | 5.2 | 3,000 | 4,800 | 6,600 | 9,000 |
| 5 | 5.4 | 5,000 | 8,000 | 11,000 | 15,000 |
| 6 | 5.5 | 8,000 | 13,000 | 17,600 | 24,000 |
| 7 | 5.6 | 10,000 | 16,000 | 22,000 | 30,000 |
| 8 | 5.8 | 30,000 | 48,000 | 66,000 | 90,000 |
| 9 | 5.9 | 50,000 | 80,000 | 110,000 | 150,000 |
| 10 | 6.2 | 100,000 | 160,000 | 220,000 | 300,000 |

FIG. 9

| EVALUATION COUNT | POWER OUTPUT EVALUATION TIME (sec) |
| --- | --- |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| 12 | 12 |
| 13 | 13 |
| 14 | 14 |
| 15 | 15 |
| 16 | 16 |
| 17 | 17 |
| 18 | 18 |
| 19 | 19 |
| 20 | 20 |

FIG. 15

SATELLITE SIGNAL RECEIVING DEVICE, METHOD OF CONTROLLING SATELLITE SIGNAL RECEIVING DEVICE, AND ELECTRONIC DEVICE

CROSS-REFERENCE TO RELATED APPLICATIONS

The entire disclosure of Japanese Patent Application Nos. 2011-009925, filed Jan. 20, 2011, and 2011-009926, filed Jan. 20, 2011, are expressly incorporated by reference herein.

BACKGROUND

1. Technical Field

The present invention relates to a satellite signal receiving device that performs positioning and adjusts the time based on signals received from positioning information satellites such as GPS satellites, to a control method for the satellite signal receiving device, and to an electronic device.

2. Related Art

Electronic devices that receive satellite signals from GPS (Global Positioning System) satellites and perform positioning and time adjustment are known from the literature (for example, document 1, Japanese Unexamined Patent Appl. Pub. JP-A-2008-39565).

When the electronic device is a device, such as a wristwatch, that moves with the user, the electronic device could conceivably move to an environment where satellite signals cannot be received, such as indoors or an underground mall.

If the reception process is executed in such an environment where satellite signals cannot be received, power is wasted. Reducing current consumption and avoiding wasteful reception processes are particularly important in battery-powered electronic devices such as wristwatches to assure sufficient duration time and reduce the battery size.

As a result, document 1 describes providing a solar panel in the electronic device, determining if the electronic device is outdoors by comparing the power output with a threshold value for determining if the electronic device is indoors or outdoors, and performing the reception process if determined to be outdoors.

However, this is based on solar panel power output corresponding to the illuminance of light incident to the solar panel. It is also based on being able to make an indoor/outdoor determination by obtaining power output corresponding to the illuminance when the electronic device is outdoors during the day and the illuminance when indoors, and setting the threshold value so that power output can be differentiated in these cases.

In reality, however, depending upon where the electronic device is used, power output can exceed the threshold value even if the electronic device is indoors, and the reception process may therefore be executed in an environment where satellite signals cannot be received.

There are also situations in which satellite signals cannot be received when the electronic device is outdoors even if the reception process is executed, such as when in an urban canyon between tall buildings. The electronic device being outdoors therefore does not mean that the environment is necessarily suited to receiving satellite signals.

Therefore, if the threshold value is fixed as described in document 1, the reception process is often executed even in environments where satellite signals cannot actually be received, and power consumption can therefore increase as a result.

Furthermore, depending on the operating conditions of the electronic device, power output may also not exceed the threshold value even when the electronic device is outdoors. For example, when the electronic device having a satellite signal receiving device is a wristwatch, power output may not exceed the threshold value even though the electronic device is outdoors if the solar cell is covered by a sleeve, for example. Depending upon the season or the weather, power output may also not exceed the threshold value even though the electronic device is outdoors because direct sunlight is not incident or is weak. In addition, when the solar cell has been used for a long time and solar cell deterioration is advanced, power output may not exceed the threshold value even though light of the same illuminance is incident to the solar cell.

As a result, when the threshold value is fixed as described in document 1, there is also the possibility that the reception process will not be performed even in an environment that is actually suited to satellite signal reception.

SUMMARY

An object of the invention is to provide a satellite signal receiving device, a method of controlling a satellite signal receiving device, and an electronic device that can determine with good accuracy using a solar cell if the environment is suited to satellite signal reception.

One aspect of the invention is a satellite signal receiving device having a receiver circuit that receives a satellite signal transmitted from a positioning information satellite, including: a solar cell that converts light energy to electrical energy; a generating state detection circuit that detects the generating state of the solar cell; and a control circuit that controls the receiver circuit and the generating state detection circuit, sets a threshold value for determining if the illuminance of light on the solar cell is a high illuminance state greater than or equal to a preset illuminance threshold level, or a low illuminance state lower than the illuminance threshold level, compares a detection value detected by the generating state detection circuit with the threshold value and operates the receiver circuit if a high illuminance state is determined, and changes the threshold value if reception of the satellite signal by the receiver circuit failed.

This aspect of the invention changes the threshold value when satellite signal reception by the receiver circuit fails regardless of whether a high illuminance state is detected as a result of comparing the detection value detected by the generating state detection circuit with the threshold value. Changing the threshold value can be configured to enable changing the threshold value in plural steps, for example, and the threshold value can be changed one step or plural steps at a time. The illuminance threshold level is a threshold value that is compared with the illuminance of light on the solar cell, and enables determining a high illuminance state or low illuminance state. A value (such as 10,000 1x) that enables differentiating illuminance when direct sunlight is incident on the solar cell outdoors from illuminance when light from lighting is incident to the solar cell indoors is set as this illuminance threshold level.

Note that a high illuminance state means a state in which the illuminance of light on the solar cell is greater than or equal to the illuminance threshold level, is a state in which the illuminance of light on the solar cell is relatively high, and is a state that normally enables determining the satellite signal receiving device with a solar cell is outdoors. The low illuminance state means a state in which the illuminance of light on the solar cell is lower than the illuminance threshold level, is a state in which the illuminance of light on the solar cell is relatively low, and is a state that normally does not enable determining that the satellite signal receiving device with a solar cell is outdoors.

If reception fails and the threshold value is changed, the threshold value is reset to a high value so that the illuminance threshold level increases when, for example, the open circuit voltage or other output value of the solar cell is the detection value, and the detection value increases as illuminance increases. By increasing the threshold value in this case, it is more difficult for the detection value detected by the generating state detection circuit to reach or exceed the threshold value. For example, when the light from lighting on an electronic device located indoors is extremely strong and the reception process is performed because the detection value exceeds the threshold value, the threshold value gradually increases because reception fails. By gradually increasing the threshold level, the detection value of the indoor lighting will eventually not exceed the threshold level and the detection value will only reach the threshold level when the electronic device moves outdoors and is exposed to direct sunlight. The threshold value can thus be optimized to the living environment of the person using the electronic device. By thus making the condition for operating the receiver circuit more stringent when the receiver circuit fails to receive a satellite signal, the receiver circuit can be operated in an environment suited to receiving satellite signals. Whether or not the environment is suited to satellite signal reception can therefore be accurately determined using a solar cell, and power consumption can be suppressed.

Preferably in a satellite signal receiving device according to another aspect of the invention, the detection value detected by the generating state detection circuit is an output value of the solar cell; and the control circuit compares the solar cell output value and the threshold value and operates the receiver circuit when a high illuminance state is determined, and resets the threshold value so that the illuminance threshold level becomes higher when satellite signal reception by the receiver circuit failed.

The output value of the solar cell could be the open circuit voltage or the short circuit current of the solar cell, or the charge current to a storage battery, which change according to the illuminance of light on the solar cell. These output values are normally set to increase as the illuminance increases, but could be set to decrease as the illuminance increases depending upon the setup of the generating state detection circuit, for example.

By resetting the threshold value so that the illuminance threshold level increases in this aspect of the invention, detecting a high illuminance state is more difficult when the detection value detected by the generating state detection circuit (such as the open circuit voltage of the solar cell) and the threshold value are compared.

By thus making the condition for operating the receiver circuit more stringent when the receiver circuit fails to receive a satellite signal, the receiver circuit can be operated in an environment suited to receiving satellite signals. Whether or not the environment is suited to satellite signal reception can therefore be accurately determined using a solar cell, and power consumption can be suppressed.

Further preferably in a satellite signal receiving device according to another aspect of the invention, when determining a high illuminance state or low illuminance state by comparing the solar cell output value and a specific value set according to the illuminance threshold level, the detection value detected by the generating state detection circuit is a power generating evaluation time, which is the time the solar cell output value is continuously in a high illuminance state; and the control circuit operates the receiver circuit when the power generating evaluation time is greater than or equal to a preset threshold value, and resets the threshold value longer when satellite signal reception by the receiver circuit failed.

The power generating evaluation time can be detected in this case as described below. That is, the power generating evaluation time, which is the time in a high illuminance state, can be detected by comparing the output value of the solar cell with a specific value set according to the illuminance threshold level and determining if there is a high illuminance state or a low illuminance state, repeating this evaluation at a specific interval (such as a 1-second interval), and counting the number of times a high illuminance state is detected consecutively.

By increasing the threshold value when the power generating evaluation time is used as the detection value as in this aspect of the invention, it is more difficult for the power generating evaluation time detected by the generating state detection circuit to reach the threshold value. For example, when the threshold value is a short time, the power generating evaluation time could exceed the threshold value and the reception process be executed when the electronic device is indoors and is momentarily exposed to direct sunlight through a window in the building. Because reception will fail if reception is attempted in this case, this aspect of the invention increases the threshold value so that the power generating evaluation time will not exceed the threshold value when momentarily exposed to directly sunlight. More specifically, the reception operation is performed when the electronic device is outdoors and the time exposed to light exceeds the threshold value.

By thus making the condition for operating the receiver circuit more stringent when the receiver circuit fails to receive a satellite signal, the receiver circuit can be operated in an environment suited to receiving satellite signals. Whether or not the environment is suited to satellite signal reception can therefore be accurately determined using a solar cell, and power consumption can be suppressed.

Further preferably in a satellite signal receiving device according to another aspect of the invention, when the control circuit searches with the receiver circuit for the positioning information satellite, the receiver circuit does not detect the satellite signal, and receiving the satellite signal fails, the control circuit resets the threshold value so that the illuminance threshold level increases or resets the threshold value of the power generating evaluation time to a longer time, and retains the same threshold value when the satellite signal is detected by the receiver circuit but reception of the satellite signal failed.

If a satellite signal was detected but satellite signal reception failed, the possibility is high that reception failed for some other reason such as entering the shadow of a building immediately after the reception process started, and the possibility that the environment was suited to satellite signal reception is high. The invention therefore determines in such cases that there is no need to change the threshold value even if receiving a satellite signal failed. The threshold value is therefore reset so that the illuminance threshold level rises or the threshold value of the power generating evaluation time becomes longer when a satellite signal is not detected by the receiver circuit. This enables more accurately detecting whether or not the environment is suited to satellite signal reception.

Further preferably in a satellite signal receiving device according to another aspect of the invention, when the low illuminance state detected based on a detection value detected by the generating state detection circuit continues for a preset generating state detection time or longer, the control circuit resets the threshold value so that the illuminance threshold level decreases, or resets the threshold value of the power generating evaluation time to a shorter time.

For example, when the electronic device having a satellite signal receiving device is a wristwatch, the detection value (such as the open circuit voltage of the solar cell) may not exceed the threshold value even though the electronic device is outdoors because the solar cell is covered by a sleeve, for example. Depending upon the season or the weather, the detection value (such as the open circuit voltage of the solar cell) may also not exceed the threshold value even though the electronic device is outdoors because direct sunlight is not incident or is weak. The invention therefore resets the threshold value so that the illuminance threshold level becomes lower or shortens the threshold value of the power generating evaluation time when a low illuminance state continues for the generating state detection time or longer. By changing the threshold value in such cases, a high illuminance state can be determined more easily when the detection value detected by the generating state detection circuit (such as the open circuit voltage of the solar cell) is compared with the threshold value. An opportunity to operate the receiver circuit can thus be provided by relaxing the condition for operating the receiver circuit. Whether or not the environment is suited to satellite signal reception can thus be determined more accurately.

Further preferably in a satellite signal receiving device according to another aspect of the invention, when the control circuit resets the threshold value so that the illuminance threshold level decreases, or resets the threshold value of the power generating evaluation time to a shorter time, plural times consecutively, the control circuit moves the receiver circuit and the generating state detection circuit to a sleep mode, and resets the threshold value to a default value when a state changing from the sleep mode to a normal mode is detected, and the receiver circuit and the generating state detection circuit change from the sleep mode to the normal mode.

When the electronic device having a satellite signal receiving device is stored in a place where there is no light, for example, the control circuit resets the threshold value so that the illuminance threshold level is lower or shortens the threshold value of the power generating evaluation time plural times consecutively. Because operating the receiver circuit and generating state detection circuit in this case is useless, power consumption is reduced by entering a sleep mode or stopping operation.

The sleep mode can be cancelled by the user operating a button, for example. Because the threshold value will be too low if it remains the same as before entering the sleep mode in this case, operating the receiver circuit will be useless. The invention can therefore prevent the receiver circuit from operating more than necessary as a result of the threshold value being too low in this case by resetting the threshold value to the default value when returning from the sleep mode to the normal mode. This enables further reducing power consumption.

Further preferably in a satellite signal receiving device according to another aspect of the invention, the control circuit executes the satellite signal reception process at a specific time interval, the time interval when the receiver circuit succeeds at receiving the satellite signal is a first time interval, the time interval when the receiver circuit fails at receiving the satellite signal is a second time interval, and the first time interval is longer than the second time interval.

When the satellite signal receiving device is incorporated in a quartz timepiece as the electronic device and time information is adjusted by receiving a satellite signal, the time accuracy of the electronic device can be sufficiently maintained for several days by the time precision of the quartz timepiece after the time has been adjusted by receiving a satellite signal. The need to receive a satellite signal is therefore reduced for awhile. However, when satellite signal reception by the reception process fails, the need to receive a satellite signal without waiting increases. When the reception process of the receiver circuit executes at an execution interval, the invention therefore sets the first time interval when GPS satellite signal reception succeeds longer than the second time interval when reception fails. This increases the time until a satellite signal is received next when satellite signal reception succeeded, prevents operating the receiver circuit more than necessary, and further reduces power consumption.

Further preferably in a satellite signal receiving device according to another aspect of the invention, the control circuit changes the threshold value when reception of the satellite signal by the receiver circuit fails plural times consecutively.

Even when the receiver circuit fails to receive a satellite signal, reception could fail for some other reason even though the environment was suited to satellite signal reception, such as entering the shadow of a building while moving in a vehicle, for example. Therefore, because the invention determines the receiver circuit is in an environment where satellite signals cannot be received and changes the threshold value when the receiver circuit fails to receive a satellite signal plural times consecutively, the threshold value can be prevented from becoming higher or longer than necessary due to some other reason. This enables more accurately determining whether or not the environment is suited to satellite signal reception.

Another aspect of the invention is a satellite signal receiving device having a receiver circuit that receives a satellite signal transmitted from a positioning information satellite, including: a solar cell that converts light energy to electrical energy; a generating state detection circuit that detects the generating state of the solar cell; and a control circuit that controls the receiver circuit and the generating state detection circuit, sets a threshold value for determining if the illuminance of light on the solar cell is a high illuminance state greater than or equal to a preset illuminance threshold level, or a low illuminance state lower than the illuminance threshold level, compares a detection value detected by the generating state detection circuit with the threshold value and operates the receiver circuit if a high illuminance state is determined, and changes the threshold value when a low illuminance state detected based on a detection value detected by the generating state detection circuit continues for a preset generating state detection time or longer.

This aspect of the invention changes the threshold value when a low illuminance state detected based on the detection value detected by the generating state detection circuit continues for a preset generating state detection time or longer. Changing the threshold value can be configured to enable changing the threshold value in plural steps, for example, and the threshold value can be changed one step or plural steps at a time. The illuminance threshold level is a threshold value that is compared with the illuminance of light on the solar cell, and enables determining a high illuminance state or low illuminance state. A value (such as 10,000 1x) that enables differentiating illuminance when direct sunlight is incident on the solar cell outdoors from illuminance when light from lighting is incident to the solar cell indoors is set as this illuminance threshold level.

Note that a high illuminance state means a state in which the illuminance of light on the solar cell is greater than or equal to the illuminance threshold level, is a state in which the illuminance of light on the solar cell is relatively high, and is a state that normally enables determining the satellite signal receiving device with a solar cell is outdoors. The low illuminance state means a state in which the illuminance of light on the solar cell is lower than the illuminance threshold level, is a state in which the illuminance of light on the solar cell is relatively low, and is a state that normally does not enable determining that the satellite signal receiving device with a solar cell is outdoors.

An example of a low illuminance state is when the open circuit voltage of the solar cell is less than the threshold value when the detection value is an output value such as the open circuit voltage of the solar cell and the detection value increases as illuminance increases. More specifically, in addition to when the electronic device is indoors and the open circuit voltage of the solar cell is low, there are cases in which the open circuit voltage of the solar cell does not exceed the threshold value even though the electronic device is actually outdoors. For example, when the electronic device having a satellite signal receiving device is a wristwatch, the open circuit voltage of the solar cell may not exceed the threshold value even though the electronic device is outdoors because the solar cell is covered by a sleeve, for example. Depending upon the season or the weather, the open circuit voltage of the solar cell may also not exceed the threshold value even though the electronic device is outdoors because direct sunlight is not incident or is weak. In addition, when the solar cell has been used for a long time and deterioration of the solar cell has advanced, the open circuit voltage of the solar cell may not exceed the threshold value even though light of the same illuminance is incident to the solar cell.

The invention therefore resets the threshold value to a lower value when the open circuit voltage of the solar cell remains lower than the threshold value for a generating state detection time such as 24 hours. Because the threshold value gradually decreases if this state repeats, the open circuit voltage of the solar cell detected by the generating state detection circuit will eventually equal or exceed the threshold value, and the reception process can be expected to be executed. This enables optimizing the threshold value to the living environment of the person using the electronic device, for example. An opportunity to operate the receiver circuit can thus be provided by relaxing the condition for operating the receiver circuit in specific cases. Whether or not the environment is suited to satellite signal reception can thus be determined more accurately, and inconveniences resulting from the reception operation not being performed for a long time can be eliminated.

Further preferably in a satellite signal receiving device according to another aspect of the invention, the detection value detected by the generating state detection circuit is an output value of the solar cell; and the control circuit sets a threshold value that is compared with an output value of the solar cell according to the illuminance threshold level, compares the solar cell output value and the threshold value and operates the receiver circuit when a high illuminance state is determined, and resets the threshold value so that the illuminance threshold level becomes lower when a low illuminance state detected based on a detection value detected by the generating state detection circuit continues for a preset generating state detection time or longer.

The output value of the solar cell could be the open circuit voltage or the short circuit current of the solar cell, or the charge current to a storage battery, which change according to the illuminance of light on the solar cell. These output values are normally set to increase as the illuminance increases, but could be set to decrease as the illuminance increases depending upon the setup of the generating state detection circuit, for example.

In this aspect of the invention, the open circuit voltage of the solar cell detected the generating state detection circuit more easily equals or exceeds the threshold value by lowering the threshold value when an output value of the solar cell such as the open circuit voltage is the detection value and the detection value increases as illuminance increases. An opportunity to operate the receiver circuit can thus be provided by relaxing the condition for operating the receiver circuit in specific cases. Whether or not the environment is suited to satellite signal reception can thus be determined more accurately using a solar cell, and inconveniences resulting from the reception operation not being performed for a long time can be eliminated.

Further preferably in a satellite signal receiving device according to another aspect of the invention, when determining a high illuminance state or low illuminance state by comparing the solar cell output value and a specific value set according to the illuminance threshold level, the detection value detected by the generating state detection circuit is a power generating evaluation time, which is the time the solar cell output value is continuously in a high illuminance state; and the control circuit operates the receiver circuit when the power generating evaluation time is greater than or equal to a preset threshold value, and resets the threshold value to a shorter time when a low illuminance state detected based on a detection value detected by the generating state detection circuit continues for a preset generating state detection time or longer.

The power generating evaluation time can be detected in this case as described below. That is, the power generating evaluation time, which is the time in a high illuminance state, can be detected by comparing the output value of the solar cell with a specific value set according to the illuminance threshold level and determining if there is a high illuminance state or a low illuminance state, repeating this evaluation at a specific interval (such as a 1-second interval), and counting the number of times a high illuminance state is detected consecutively.

The power generating evaluation time detected by the generating state detection circuit more easily becomes greater than or equal to the threshold value when the power generating evaluation time is the detection value and the threshold value becomes shorter as in this aspect of the invention. For example, by gradually shortening the power generating evaluation time used as the threshold value when the solar cell is covered by a sleeve and is only momentarily exposed to direct sunlight, for example, the power generating evaluation time will eventually go to the threshold value or above even when direct sunlight is momentarily incident. An opportunity to operate the receiver circuit can thus be provided by relaxing the condition for operating the receiver circuit in specific cases. Whether or not the environment is suited to satellite signal reception can thus be determined more accurately using a solar cell, and inconveniences resulting from the reception operation not being performed for a long time can be eliminated.

Further preferably in a satellite signal receiving device according to another aspect of the invention, when the control circuit resets the threshold value so that the illuminance threshold level decreases, or resets the threshold value of the power generating evaluation time shorter, plural times consecutively, the control circuit moves the receiver circuit and the generating state detection circuit to a sleep mode, and resets the threshold value to a default value when a state changing from the sleep mode to a normal mode is detected, and the receiver circuit and the generating state detection circuit change from the sleep mode to the normal mode.

When the electronic device having a satellite signal receiving device is stored in a place where there is no light, for example, the control circuit resets the threshold value so that the illuminance threshold level is lower or shortens the threshold value of the power generating evaluation time plural times consecutively. Because operating the receiver circuit and generating state detection circuit in this case is useless, power consumption is reduced by entering a sleep mode or stopping operation.

The sleep mode can be cancelled by the user operating a button, for example. Because the threshold value will be too low if it remains the same as before entering the sleep mode in this case, operating the receiver circuit will be useless. The invention can therefore prevent the receiver circuit from operating more than necessary as a result of the threshold value being too low in this case by resetting the threshold value to the default value when returning from the sleep mode to the normal mode. This enables further reducing power consumption.

Further preferably in a satellite signal receiving device according to another aspect of the invention, the control circuit executes the satellite signal reception process at a specific time interval, the time interval when the receiver circuit succeeds at receiving the satellite signal is a first time interval, the time interval when the receiver circuit fails at receiving the satellite signal is a second time interval, and the first time interval is longer than the second time interval.

When the satellite signal receiving device is incorporated in a quartz timepiece as the electronic device and time information is adjusted by receiving a satellite signal, the time accuracy of the electronic device can be sufficiently maintained for several days by the time precision of the quartz timepiece after the time has been adjusted by receiving a satellite signal. The need to receive a satellite signal is therefore reduced for awhile. However, when satellite signal reception by the reception process fails, the need to receive a satellite signal without waiting increases. When the reception process of the receiver circuit executes at an execution interval, the invention therefore sets the first time interval when GPS satellite signal reception succeeds longer than the second time interval when reception fails. This increases the time until a satellite signal is received next when satellite signal reception succeeded, prevents operating the receiver circuit more than necessary, and further reduces power consumption.

Another aspect of the invention is a method of controlling a satellite signal receiving device that has a receiver circuit that receives a satellite signal transmitted from a positioning information satellite, a solar cell that converts light energy to electrical energy, and a generating state detection circuit that detects the generating state of the solar cell, comprising steps of: setting a threshold value for determining if the illuminance of light on the solar cell is a high illuminance state greater than or equal to a preset illuminance threshold level, or a low illuminance state lower than the illuminance threshold level; comparing a detection value detected by the generating state detection circuit with the threshold value and operating the receiver circuit if a high illuminance state is determined; and changing the threshold value if reception of the satellite signal by the receiver circuit failed.

Another aspect of the invention is a method of controlling a satellite signal receiving device that has a receiver circuit that receives a satellite signal transmitted from a positioning information satellite, a solar cell that converts light energy to electrical energy, and a generating state detection circuit that detects the generating state of the solar cell, comprising steps of: setting a threshold value for determining if the illuminance of light on the solar cell is a high illuminance state greater than or equal to a preset illuminance threshold level, or a low illuminance state lower than the illuminance threshold level; comparing a detection value detected by the generating state detection circuit with the threshold value and operating the receiver circuit if a high illuminance state is determined; and changing the threshold value when a low illuminance state detected based on a detection value detected by the generating state detection circuit continues for a preset generating state detection time or longer.

Another aspect of the invention is an electronic device having the satellite signal receiving device described above.

The control method of a satellite signal receiving device and the electronic device according to the invention achieve the save operating effect as the satellite signal receiving device described above.

BRIEF DESCRIPTION OF THE DRAWINGS

The invention will be described with reference to the accompanying drawings, wherein like numbers reference like elements.

FIG. 8 shows the relationship between the open circuit voltage of the solar cell and the illuminance of light striking the solar cell at different detection levels.

FIG. 9 shows the relationship between the open circuit voltage of the solar cell and the illuminance of light striking the solar cell according to the number of days the electronic device has been used at different detection levels.

FIG. 15 shows the relationship between the evaluation count and power output evaluation time.

DESCRIPTION OF EMBODIMENTS

A first embodiment, which is a preferred embodiment of the invention, is described below with reference to the accompanying figures.

Note that the following examples are specific preferred embodiments of the invention and describe technically desirable limitations, but the scope of the invention is not limited thereby unless such limitation is specifically stated below.

Figure 1:
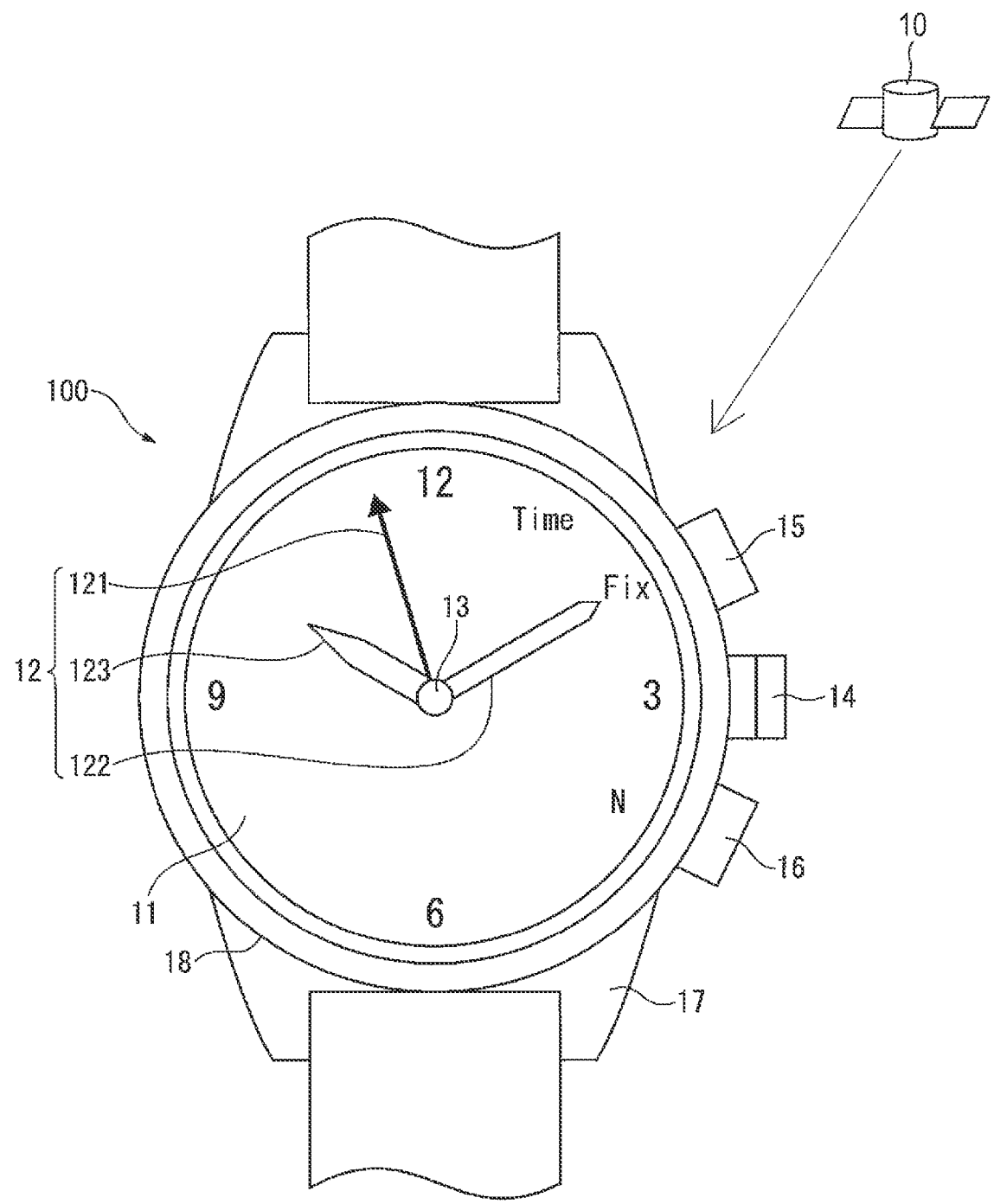
FIG. 1 is a plan view of an electronic device.
Figure 2:
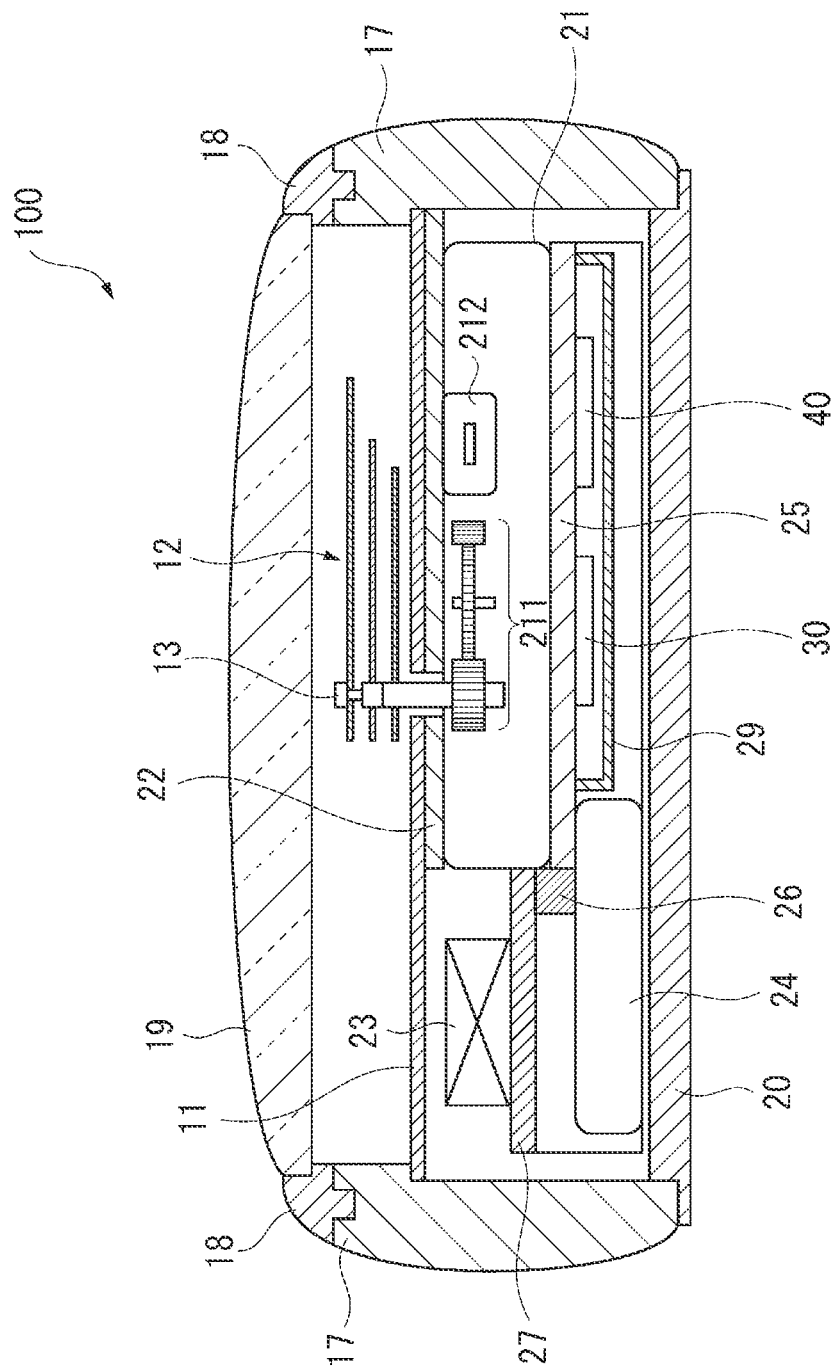
FIG. 2 is a section view of the electronic device.

FIG. 1 is a plan view of a electronic device 100 with a satellite signal receiving device according to a first embodiment of the invention, and FIG. 2 is a section view of the electronic device 100.

As will be understood from FIG. 1, the electronic device 100 is a wristwatch (electronic timepiece) that is worn on the user's wrist, has a dial 11 and hands 12, and keeps and displays time on the face.

Most of the dial 11 is made from a non-metallic material (such as plastic or glass) through which light and microwaves in the 1.5 GHz band can pass easily.

The hands 12 are disposed on the face side of the dial 11. The hands 12 include a second hand 121, minute hand 122, and hour hand 123 that rotate on a center shaft 13, and are driven by a stepper motor through an intervening wheel train.

The electronic device 100 executes specific processes when the crown 14, button 15, and button 16 are manually operated. More specifically, when the crown 14 is operated, a manual adjustment process that corrects the displayed time according to how the crown 14 is operated is performed. When button 15 is depressed for an extended time (such as 3 or more seconds), a reception process for receiving satellite signals is performed.

When button 16 is pressed, a switching process for changing the reception mode (between a timekeeping mode and a positioning mode) is performed. The second hand 121 jumps to the Time position (5-second position) when the timekeeping mode is selected, and the second hand 121 jumps to the Fix position (10-second position) when the positioning mode is set.

If the button 15 is pressed for a short time, a display result process that displays the result of the previous reception process is performed. For example, the second hand 121 jumps to the Time position (the 5-second position) if reception was successful in the timekeeping mode, and the second hand 121 jumps to the Fix position (10-second position) if reception was successful in the positioning mode. If reception failed, the second hand 121 jumps to the N position (20-second position).

Note that the second hand 121 also moves to these positions during reception. More specifically, the second hand 121 moves to the Time position (the 5-second position) during reception in the timekeeping mode, and the second hand 121 moves to the Fix position (10-second position) during reception in the positioning mode. If a GPS satellite 10 cannot be tracked, the second hand 121 moves to the N position (20-second position).

As shown in FIG. 2, the electronic device 100 has an outside case 17 that is made of stainless steel, titanium, or other metal. The outside case 17 is basically cylindrically shaped. A crystal 19 is attached to the opening on the face side of the outside case 17 by an intervening bezel 18. The bezel 18 is made from a non-metallic material such as ceramic in order to improve satellite signal reception performance. A back cover 20 is attached to the opening on the back side of the outside case 17. Inside the outside case 17 are disposed a movement 21, a solar cell 22, a GPS antenna 23, and a storage battery 24.

The movement 21 includes a stepper motor and wheel train 211. The stepper motor has a motor coil 212, a stator and a rotor, and drives the hands 12 through the wheel train 211 and rotating center shaft 13.

A circuit board 25 is disposed on the back cover 20 side of the movement 21. The circuit board 25 is connected through a connector 26 to an antenna circuit board 27 and the storage battery 24.

A GPS receiver circuit 30 including a receiver circuit for processing satellite signals received through the GPS antenna 23, and a control circuit 40 that controls driving the stepper motor, for example, are mounted on the circuit board 25. The GPS receiver circuit 30 and control circuit 40 are covered by a shield plate 29, and are driven by power supplied from the storage battery 24.

The solar cell 22 is a photovoltaic device that converts light energy to electrical energy and outputs power. The solar cell 22 has an electrode for outputting the produced power, and is disposed on the back cover side of the dial 11. Most of the dial 11 is made from a material through which light passes easily, and the solar cell 22 receives and converts light passing through the crystal 19 and dial 11 to electrical power.

The storage battery 24 is the power supply for the electronic device 100, and stores power produced by the solar cell 22. The two electrodes of the solar cell 22 and the two electrodes of the storage battery 24 can be electrically connected in the electronic device 100, and the storage battery 24 is charged by the photovoltaic power generation of the solar cell 22 when thus electrically connected. Note that this embodiment of the invention uses a lithium ion battery, which is well suited to mobile devices, as the storage battery 24, but the invention is not so limited and lithium polymer batteries or other types of storage batteries, or a storage device other than a storage battery (such as a capacitive device), may be used instead.

The GPS antenna 23 is an antenna that can receive microwaves in the 1.5 GHz band, and is mounted on the antenna circuit board 27 located on the back cover 20 side of the dial 11. The part of the dial 11 overlapping the GPS antenna 23 in the direction perpendicular to the dial 11 is made from a material through which 1.5-GHz microwave signals pass easily (such as a non-metallic material with low conductivity and low magnetic permeability). The solar cell 22 with electrodes does not intervene between the GPS antenna 23 and the dial 11. The GPS antenna 23 can therefore receive satellite signals passing through the crystal 19 and the dial 11.

The closer the distance between the GPS antenna 23 and the solar cell 22, loss can result from electrical connection between metal components of the GPS antenna 23 and the solar cell 22, and the radiation pattern of the GPS antenna 23 may be blocked by the solar cell 22 and become smaller. The GPS antenna 23 and solar cell 22 are therefore disposed with at least a specific distance therebetween in this embodiment of the invention to prevent a drop in reception performance.

The GPS antenna 23 is also disposed with at least a specific distance to metal parts other than the solar cell 22. For example, if the outside case 17 and movement 21 contain metal parts, the GPS antenna 23 is disposed so that the distance to the outside case 17 and the distance to the movement 21 is at least this specific distance. Note that a patch antenna (microstrip antenna), helical antenna, chip antenna, or inverted F-type antenna, for example, could be used as the GPS antenna 23.

The GPS receiver circuit 30 is a load that is driven by power stored in the storage battery 24, attempts to receive satellite signals from the GPS satellites 10 through the GPS antenna 23 each time the GPS receiver circuit 30 is driven, supplies the acquired orbit information, GPS time information, and other information to the control circuit 40 when reception succeeds, and sends a failure report to the control circuit 40 when reception fails. Note that the configuration of the GPS receiver circuit 30 is the same as the configuration of a GPS receiver circuit known from the literature, and description thereof is omitted.

Figure 3:
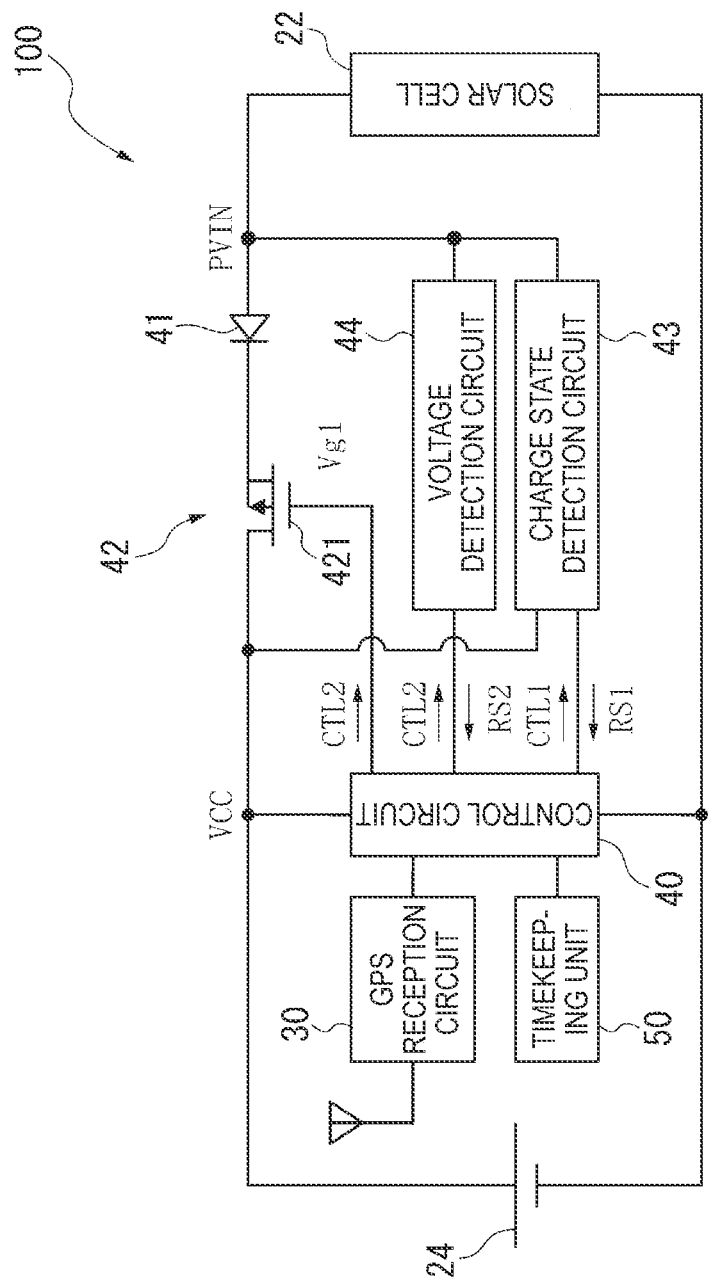
FIG. 3 is a block diagram showing the circuit configuration of the electronic device.

FIG. 3 is a block diagram showing the circuit configuration of the electronic device 100. As shown in this figure, the electronic device 100 has a solar cell 22, storage battery 24, GPS receiver circuit 30, control circuit 40, diode 41, charging control switch 42, charge state detection circuit 43, voltage detection circuit 44, and timekeeping unit 50. Note that a generating state detection circuit includes the charge state detection circuit 43 and voltage detection circuit 44.

The control circuit 40 includes a CPU for controlling the electronic device 100 with a satellite signal receiving device. As described below, the control circuit 40 controls the GPS receiver circuit 30 and executes a reception process. The control circuit 40 also controls operation of the charge state detection circuit 43 and voltage detection circuit 44.

Diode 41 is disposed to a path that electrically connects the solar cell 22 and storage battery 24, and blocks current from the storage battery 24 to the solar cell 22 (reverse current) without blocking current from the solar cell 22 to the storage battery 24 (forward current). Note that forward current flow is limited to when the solar cell 22 voltage is greater than the storage battery 24 voltage, that is, while charging. A field-effect transistor (FET) may also be used instead of a diode 41.

The charging control switch 42 closes and opens the current path from the solar cell 22 to the storage battery 24, and includes a switching device 421 disposed to a path that electrically connects the solar cell 22 and storage battery 24. The charging control switch 42 turns on (closes) when the switching device 421 switches from the off state to the on state, and turns off (opens) when the switching device 421 switches from the on state to the off state.

For example, to prevent the battery voltage of the storage battery 24 from going above a specific level so that battery characteristics do not deteriorate as a result of overcharging, the switching device 421 that turns the charging control switch 42 off is a p-channel transistor that turns off when the gate voltage Vg1 is LOW and turns on when the gate voltage Vg1 is HIGH. The gate voltage Vg1 is controlled by the control circuit 40.

The charge state detection circuit 43 operates based on a binary control signal CTL1 that specifies the charge state detection timing, detects the state of charging from the solar cell 22 to the storage battery 24 (the charge state), and outputs detection result RS1 to the control circuit 40. The charge state is either "charging" or "not charging", and charge state detection is based on the battery voltage VCC and PVIN from the solar cell 22 when the charging control switch 42 is ON. For example, if the voltage drop of the diode 41 is Vth and the ON resistance of the switching device 421 is ignored, "charging" can be determined when PVIN-Vth>VCC, and "not charging" can be determined when PVIN-Vth≤VCC.

In this embodiment of the invention the control signal CTL1 is a pulse signal with a 1-second period, and the charge state detection circuit 43 detects the charge state when the control signal CTL1 is HIGH. More specifically, the charge state detection circuit 43 repeatedly detects the charge state on a 1-second period while the charging control switch 42 remains closed.

Note that the charge state is detected intermittently to reduce the power consumption of the charge state detection circuit 43. If this reduction is not necessary, the charge state may be detected continuously. The charge state detection circuit 43 can be configured using a comparator or A/D converter, for example.

The voltage detection circuit 44 operates based on a binary control signal CTL2 that specifies the voltage detection timing, and detects the terminal voltage PVIN of the solar cell 22, that is, the open circuit voltage of the solar cell 22, when the charging control switch 42 is turned off by the control signal CTL2. The voltage detection circuit 44 outputs the detection result RS2 of the open circuit voltage to the control circuit 40.

The timekeeping unit 50 includes the movement 21, is driven by power stored in the storage battery 24, and runs a timekeeping process. This timekeeping process both keeps the time and displays the time corresponding to the kept time (the display time) on the face of the electronic device 100.

Control Circuit Operation

The operation of the control circuit 40 in this electronic device 100 is described below based on the flow chart in FIG. 4.

Figure 5:
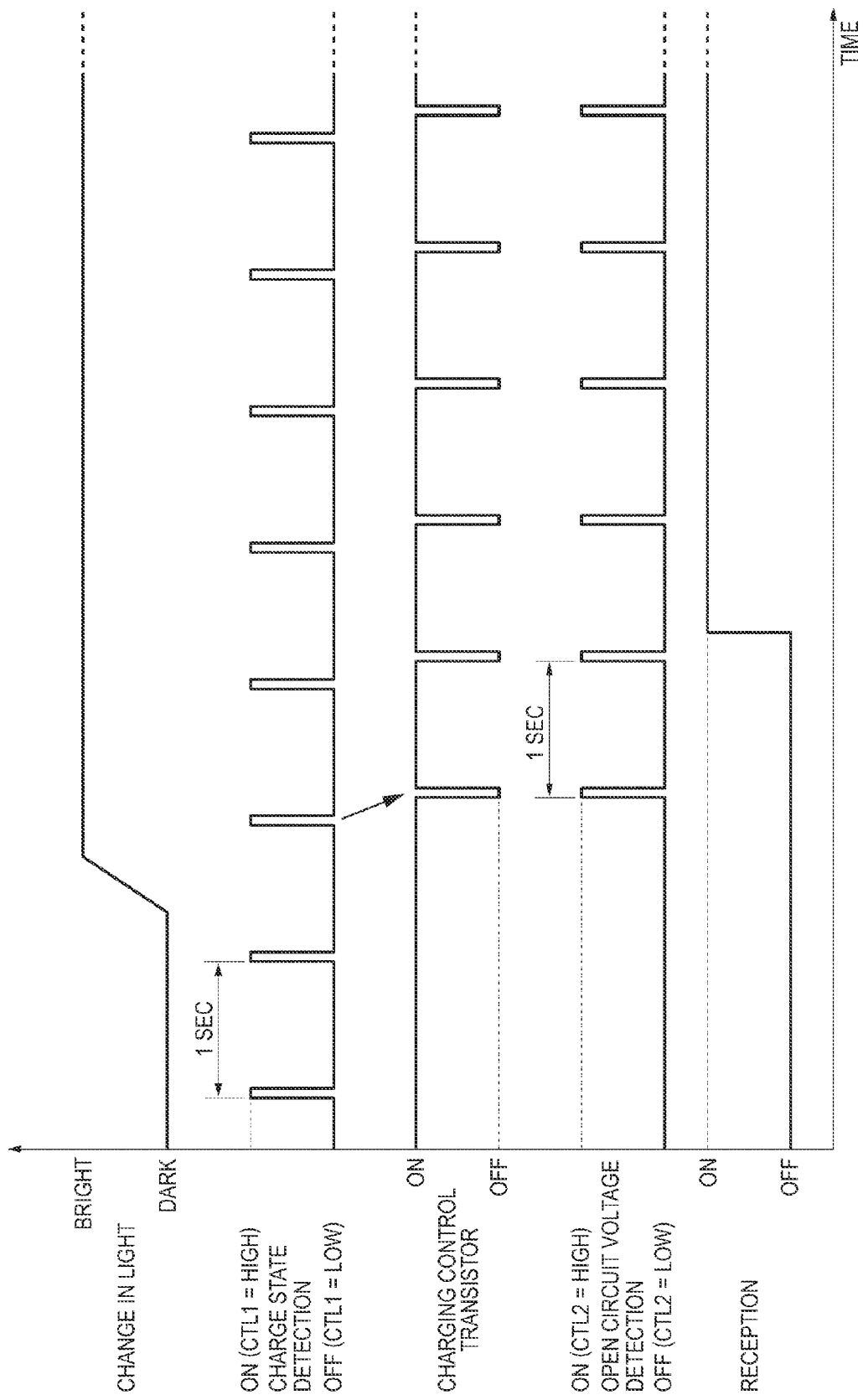
FIG. 5 is a timing chart of charge state detection, open circuit voltage detection, and reception process operation.

The control circuit 40 starts the control process at 12:00:00 daily. The control circuit 40 first operates the charge state detection circuit 43 at a constant period (SA1). As shown in FIG. 5, the control circuit 40 in this embodiment of the invention outputs control signal CTL1 every 1 second and operates the charge state detection circuit 43. When control signal CTL1 is input, the charge state detection circuit 43 outputs detection result RS1 indicating whether or not the battery is charging to the control circuit 40. The control circuit 40 thus determines if charging is in progress or not (SA2). Note that as described below the charging control switch 42 turns off only at the timing when the voltage detection circuit 44 is operated.

Control in the not-Charging State

When the light on the electronic device 100 is dark and the solar cell 22 is producing power, the charge state detection circuit 43 outputs a not-charging detection result RS1 to the control circuit 40. In this case the control circuit 40 determines that charging is not in progress (SA2 returns No), and the control circuit 40 outputs the control signal CTL2 LOW.

Therefore, when SA2 returns No, the control circuit 40 can determine that the likelihood is high that the electronic device 100 is not outdoors and not in a place suited to GPS signal reception.

Control in the Charging State

When it is determined in SA2 that charging is in progress (SA2 returns Yes), the control circuit 40 operates the voltage detection circuit 44 (SA3). In this case, the charging control switch 42 is switched to the off state by the control circuit 40 as described above. More specifically, if the charge state detection circuit 43 determines that charging is in progress, the control circuit 40 outputs control signal CTL2 at a 1-second interval and operates the voltage detection circuit 44. Because the charging control switch 42 is turned off by the control signal CTL2 from the control circuit 40, the solar cell 22 and voltage detection circuit 44 are isolated from the storage battery 24. As a result, the voltage detection circuit 44 is not affected by the voltage charge of the storage battery 24, and can detect the open circuit voltage corresponding to the illuminance of the light incident to the solar cell 22.

Note that when in the off state the charging control switch 42 cannot detect the charge state by means of the charge state detection circuit 43. As a result, the output timing of control signal CTL1 and control signal CTL2 is offset so that the output timing of the control signal CTL1 to the charge state detection circuit 43 and the output timing of the control signal CTL2 to the voltage detection circuit 44 do not match.

Figure 6:
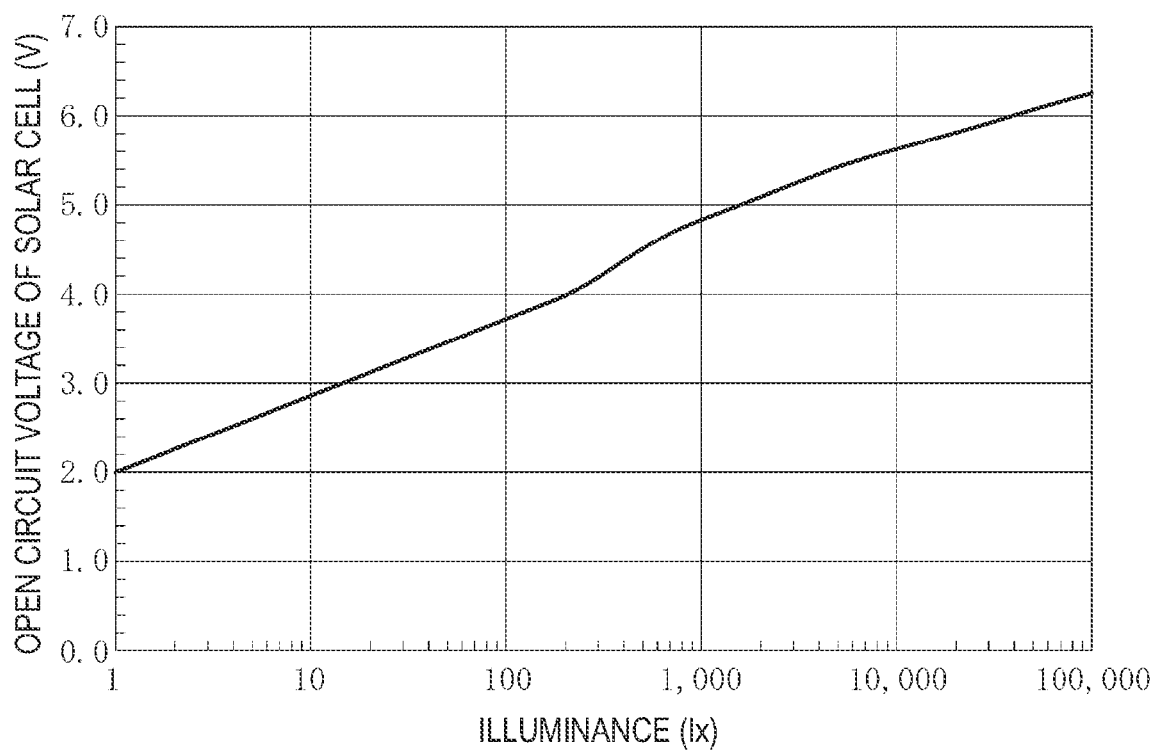
FIG. 6 is a graph showing the relationship the illuminance of light striking the solar cell of the electronic device, and the open circuit voltage of the solar cell.

In this embodiment of the invention the open circuit voltage detected by the voltage detection circuit 44 increases as the illuminance on the solar cell 22 increases as shown in FIG. 6.

Figure 7:
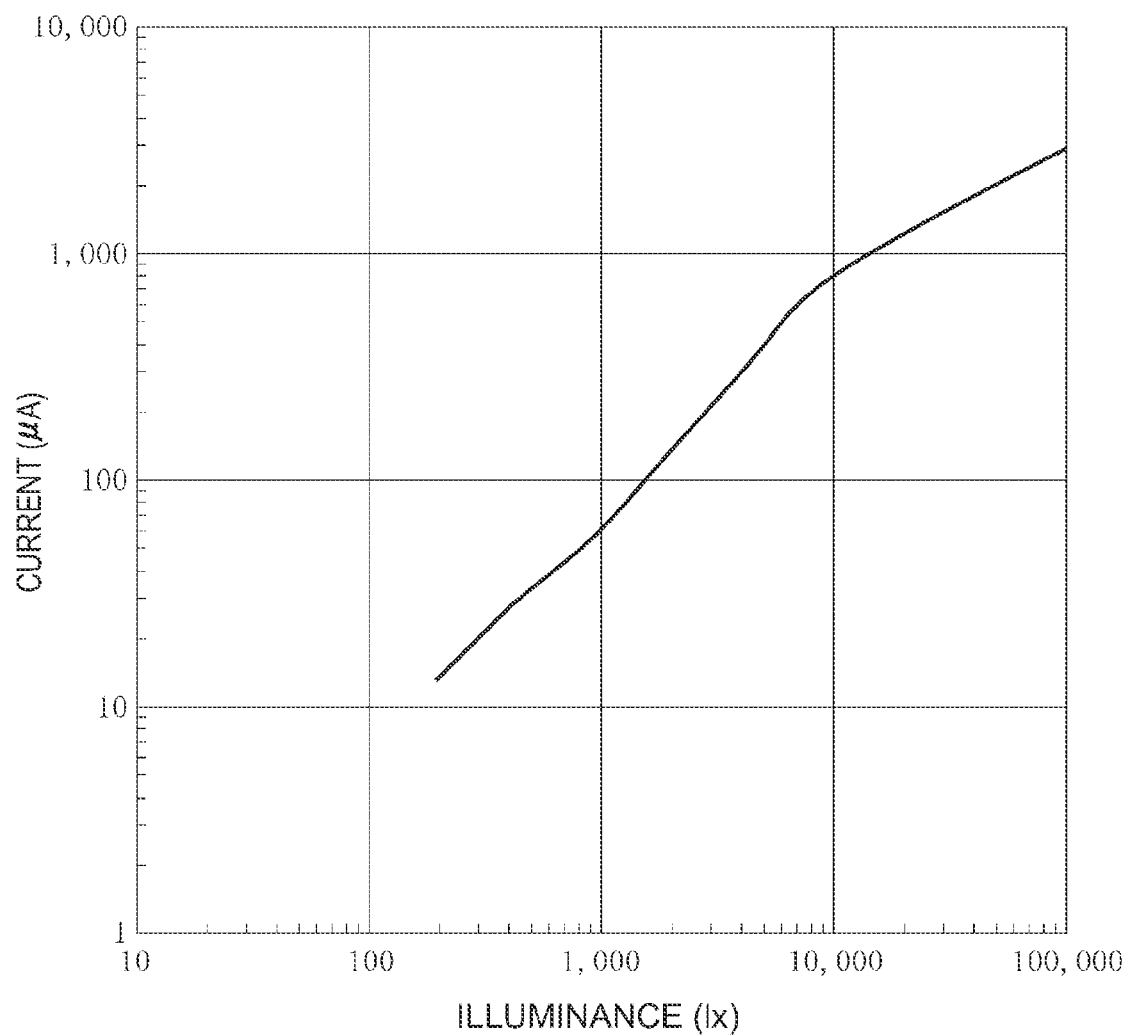
FIG. 7 is a graph showing the relationship the illuminance of light striking the solar cell of the electronic device, and the short circuit current of the solar cell.

A configuration that detects the illuminance incident to the solar cell 22 by detecting the short circuit current of the solar cell 22 instead of the open circuit voltage of the solar cell 22 may be used as the voltage detection circuit 44. More specifically, a configuration in which the short circuit current increases as the illuminance on the solar cell 22 increases as shown in FIG. 7 may be used. Note that as in a configuration that detects the open circuit voltage, the influence of the storage battery 24 must be prevented in a configuration that detects the short circuit current by turning the charging control switch 42 off to electrically separate the solar cell 22 and storage battery 24.

The open circuit voltage and the short circuit current are related to the output of the solar cell 22. As a result, this embodiment of the invention detects the open circuit voltage or short circuit current as the detection value.

The control circuit 40 determines the detection level of the open circuit voltage from the detection result RS2 output from the voltage detection circuit 44 (SA4). In this embodiment of the invention the control circuit 40 evaluates the detection level based on the relationship shown in FIG. 8. Note that the open circuit voltage and illuminance shown in FIG. 8 are the lower limits of each detection level. For example, if the open circuit voltage is greater than or equal to 5.6 V and less than 5.8 V, the control circuit 40 determines the detection level is 7, and determines the detection level is 9 if the open circuit voltage is greater than or equal to 5.9 V and less than 6.2 V.

Figure 4:
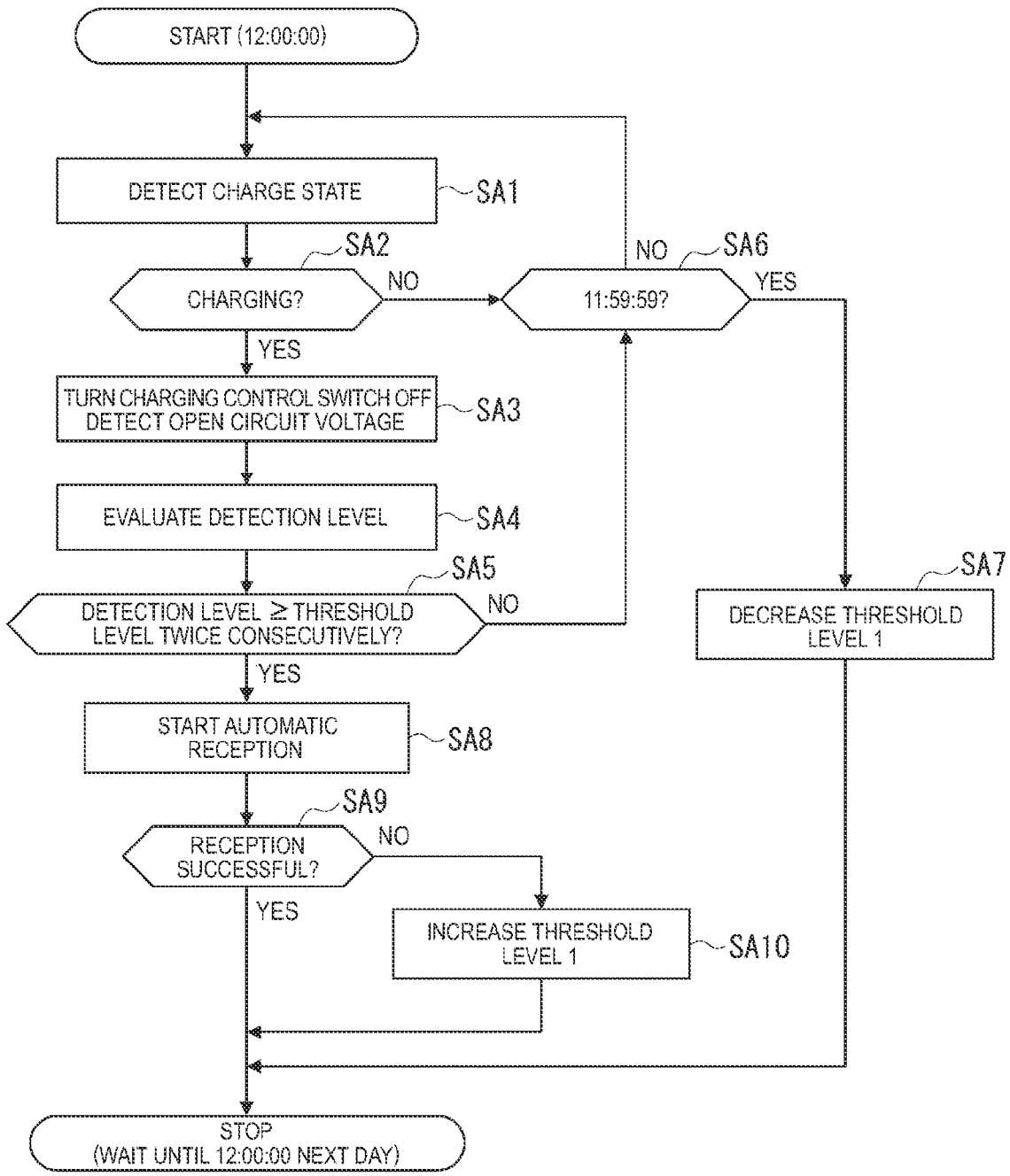
FIG. 4 is a flow chart of a process executed by the control circuit in a first embodiment of the invention.

As shown in FIG. 4, the control circuit 40 determines if the detection level determined in SA4 is greater than or equal to a threshold level, which is a preset threshold value, twice consecutively based on the voltage detected at 1-second intervals (SA5). The relationship between the threshold level and the open circuit voltage of the solar cell is preset based on the relationship shown in FIG. 8. More specifically, the threshold value for determining if the illuminance of the light on the solar cell 22 is a high illuminance level that is greater than or equal to a preset illuminance threshold level, or is a low illuminance level that is lower than the illuminance threshold level, is set based on this figure. However, the relationship between the threshold level and the open circuit voltage of the solar cell is not limited to the relationship shown in FIG. 8, and can be suitably set. In addition, while the threshold value level increases and decreases as described below, the initial threshold level is set to 7 in this embodiment of the invention. While the illuminance of light on the solar cell 22 under fluorescent lights is normally 500-100 1x, the illuminance of light on the solar cell 22 in sunlight normally exceeds 10,000 1x. Detection level 7 corresponding to light of 10,000 1x on the solar cell 22 is therefore set as the initial threshold level.

If SA5 returns No (when illuminance is low), the control circuit 40 can determine the likelihood is high that the electronic device 100 is not outdoors and is not in a place suited to GPS signal reception.

More specifically, if the electronic device 100 is outdoors during the day, light exceeding the threshold level should be continuously incident for more than 1 second on the solar cell 22. The likelihood that the electronic device 100 is outdoors can therefore be determined to be high if an open circuit voltage exceeding the threshold level is detected twice consecutively when the open circuit voltage is detected at a 1-second interval.

However, if an open circuit voltage exceeding the threshold level cannot be detected two or more times consecutively, it is conceivable that, for example, the open circuit voltage does not go to or above the threshold level even once because the person wearing the wristwatch that is the electronic device 100 is moving indoors, or the open circuit voltage does not go to or above the threshold level two or more times consecutively because sunlight through a window in a building was momentarily incident to the solar cell 22. Receiving a GPS signal with good sensitivity is difficult under such conditions.

This embodiment of the invention therefore determines in SA5 if the detection level equals or exceeds the threshold level twice consecutively. Note that this evaluation is not limited to determining if the detection level exceeds the threshold level twice consecutively. For example, the condition could be that the detection level is greater than or equal to the threshold level three or more times consecutively, or the condition could be that a detection level equal to or greater than the threshold level is detected once.

If No is returned by SA2 or SA5, the control circuit 40 determines if the current time is before 11:59:59 of the day after control started (SA6). The control circuit 40 thus determines if a preset generating state detection time passed without performing the reception process. In this case the generating state detection time is 24 hours. If No is returned in SA6, the control circuit 40 returns to SA1 and operates the charge state detection circuit 43 at a specific period.

However, if SA6 returns Yes (a high illuminance state), the threshold level is reset to one level lower (SA7), the process ends, and a standby state is entered for a resume-control time at which the control circuit 40 next starts the process. The resume-control time in this embodiment of the invention is one second later at 12:00:00. By thus resetting the threshold level to one level lower when a state in which the detection level is less than the threshold level continues for a generating state detection time (such as 24 hours) or longer, the detection level can more easily equal or exceed the threshold level. An opportunity to operate the GPS receiver circuit 30 can thus be provided by relaxing the condition for operating the GPS receiver circuit 30.

Various reasons why SA6 returns Yes are thus conceivable, and a case in which the solar cell 22 of the electronic device 100 has been used for a long time and deterioration of the solar cell 22 has advanced is described below.

Figure 10:
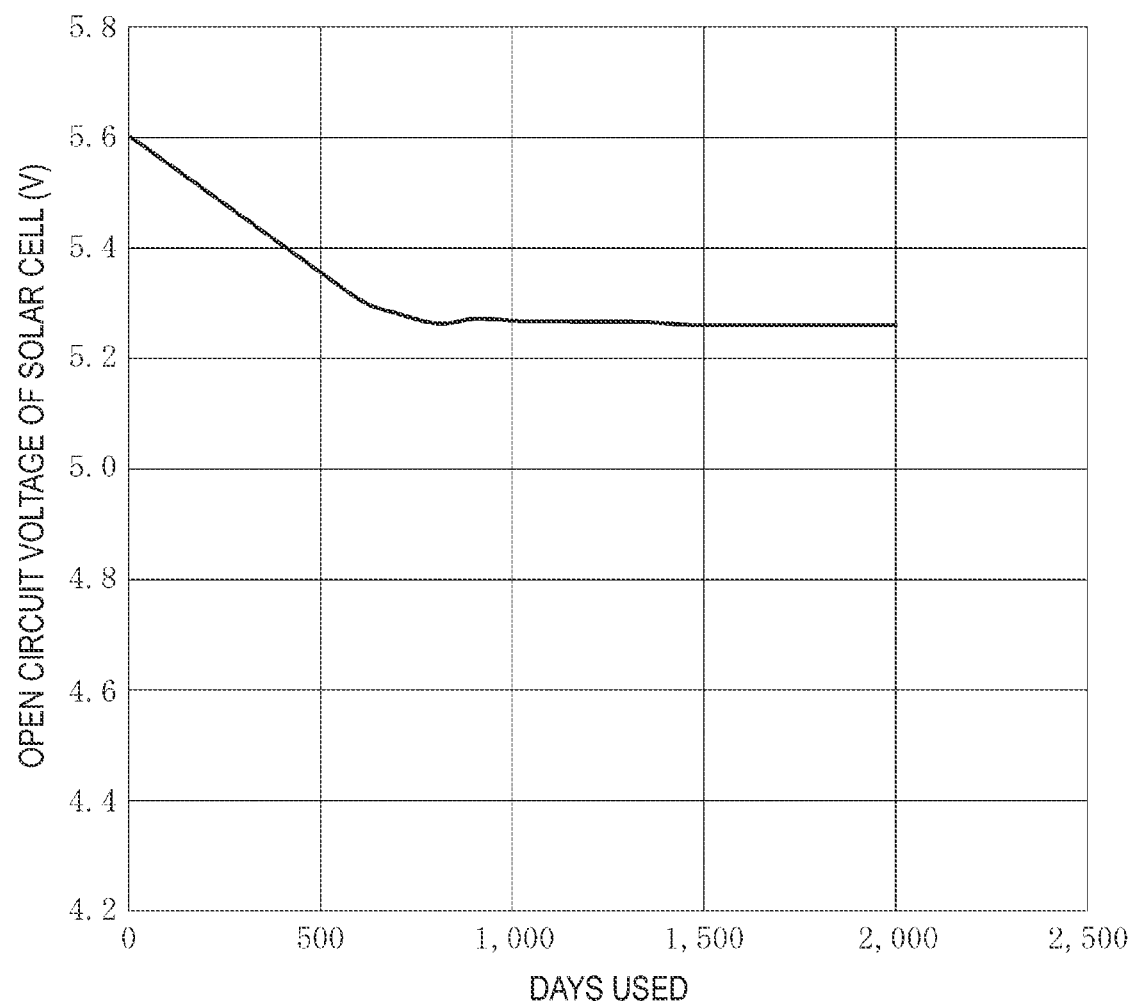
FIG. 10 is a graph showing the relationship between the number of days the electronic device was used with the solar cell exposed to 10,000 1x of light, and the open circuit voltage of the solar cell.
Figure 11:
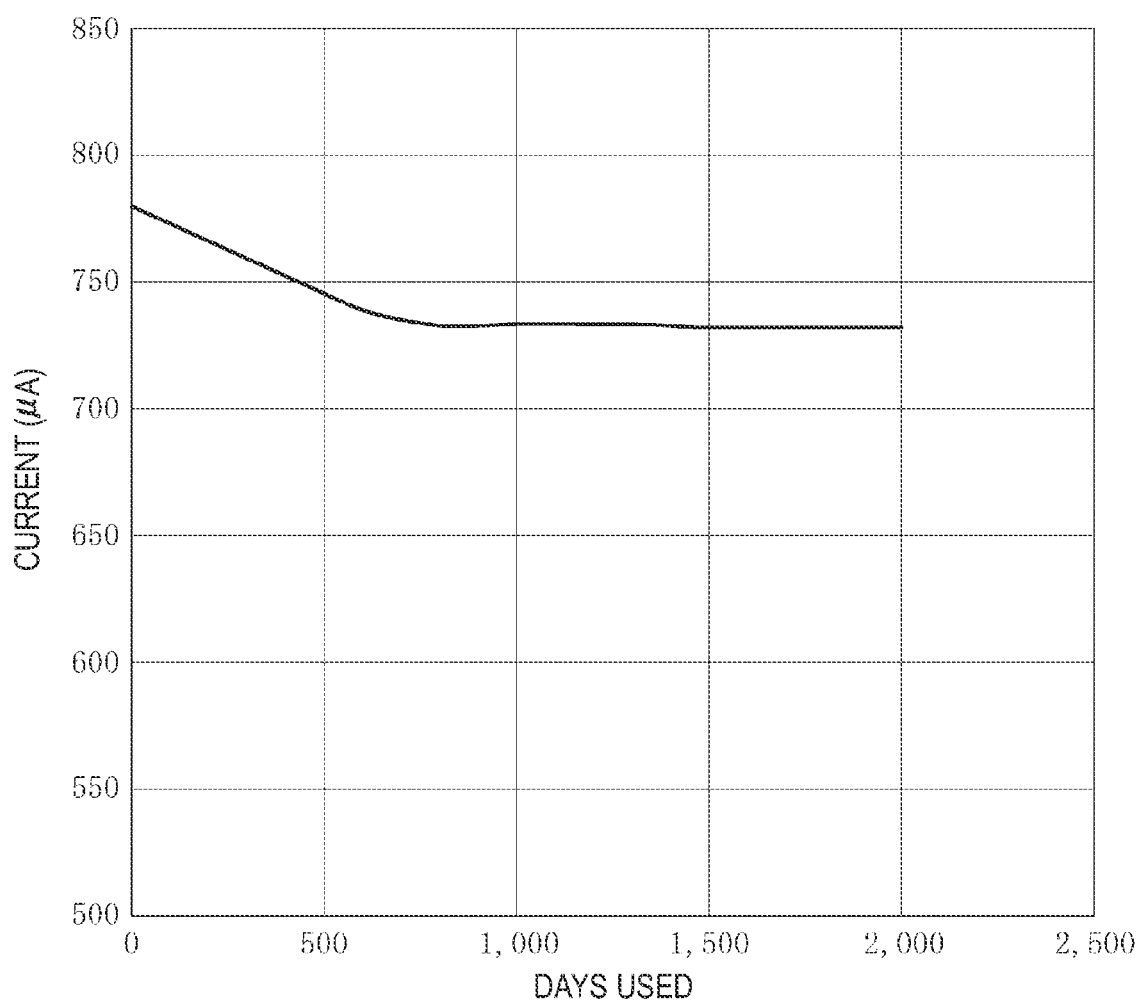
FIG. 11 is a graph showing the relationship between the number of days the electronic device was used with the solar cell exposed to 10,000 1x of light, and the short circuit current of the solar cell.

FIG. 9 shows the relationship between the open circuit voltage of the solar cell 22 at each detection level, and the illuminance of light on the solar cell 22 corresponding to the number of days the solar cell 22 was used. FIG. 10 is a graph showing the relationship between the number of days the solar cell 22 was used and the open circuit voltage when light of 10,000 1x is incident to the solar cell 22. FIG. 11 is a graph showing the relationship between the number of days the solar cell 22 was used and the short circuit current when light of 10,000 1x is incident to the solar cell 22.

As shown in FIG. 9 to FIG. 11, the solar cell 22 deteriorates and power conversion efficiency drops as the number of days the solar cell 22 was used increases. As a result, the open circuit voltage detected by the voltage detection circuit 44 therefore decreases as the number of days used increases even though light of the same illuminance is incident to the solar cell 22, and the detection level evaluated by the control circuit 40 drops. The problem with using a constant threshold level in such cases is that the control circuit 40 cannot appropriately determine if the electronic device 100 is outdoors.

However, this embodiment of the invention can provide an opportunity to operate the GPS receiver circuit 30 because the threshold level is gradually lowered when deterioration of the solar cell 22 progresses and the reception process will not performed because the detection level drops and will not exceed the threshold level even when exposed to 10,000 1× of light.

Because an environment suitable to receiving GPS signals can be expected as described above if SA5 returns Yes, the control circuit 40 operates the GPS receiver circuit 30 and starts GPS satellite reception (SA8).

The reception process started in SA8 is an automatic reception process that is automatically performed when specific conditions are met. The reception process is executed in the timekeeping mode in this automatic reception process. The reception process takes longer in the positioning mode because signals must be received from three or more GPS satellites 10 in order to determine the position. As a result, the electronic device 100 is preferably kept outdoors until signal reception ends, but the user may not realize that reception is in progress in the automatic reception process and may move indoors during reception. As a result, reception in the positioning mode is preferably done only when the user intentionally starts reception, that is, only in a manual reception process.

In the timekeeping mode, however, time information can be acquired by receiving signals from one GPS satellite 10, and the length of the reception process can be shortened. The reception process can therefore be executed even if the user is unaware, and is suited to an automatic reception process.

Furthermore, because reception sensitivity is affected if the hands 12 are over the antenna circuit board 27 during the reception process, the motor is preferably controlled so that the hands 12 do not overlap the antenna circuit board 27.

As shown in FIG. 4, the control circuit 40 determines if GPS satellite signal reception was successful in the reception process started in SA8 (SA9).

Note that the GPS receiver circuit 30 first looks for a GPS satellite 10 and the GPS receiver circuit 30 detects a GPS satellite signal. If a GPS satellite signal is detected, GPS satellite signal reception continues and time information is received. If receiving time information was successful, receiving a GPS satellite signal in the reception process was determined to be successful. Otherwise, that is, if the GPS receiver circuit 30 could not detect a GPS satellite signal or time information could not be received, the reception process was determined to have failed in receiving a GPS satellite signal.

If the reception process succeeded in receiving a GPS satellite signal (SA9 returns Yes), the process ends and a standby state is entered until the resume-control time of 12:00:00 the next day.

However, if GPS satellite signal reception failed in the reception process (SA9 returns No), the threshold level is reset to one level higher (SA10), the process ends, and a standby state is entered until the resume-control time of 12:00:00 the next day. Increasing the threshold level one level makes it more difficult for the detection level to equal or exceed the threshold level when the process of SA1 restarts from 12:00:00 the next day. More specifically, if particularly strong light from indoor lighting is incident to the electronic device 100 when indoors and the reception process is performed because the detection level equals or exceeds the threshold level, the threshold level is increased one level because reception fails. By thus increasing the threshold level one level at a time, the detection level of the indoor lighting will eventually not exceed the threshold level and the detection level will only reach the threshold level when the electronic device 100 moves outdoors and is exposed to direct sunlight. The threshold level can thus be optimized to the living environment of the person using the electronic device 100. By thus making the condition for operating the GPS receiver circuit 30 more stringent when the GPS receiver circuit 30 fails to receive a GPS satellite signal, the GPS receiver circuit 30 can be operated in an environment suited to receiving GPS satellite signals.

The operating effect of the first embodiment is described below.

When GPS satellite signal reception by the GPS receiver circuit 30 fails, the control circuit 40 resets the threshold level to one higher level. Thus raising the threshold level one level makes it more difficult for the detection level to reach the threshold level. By thus making the condition for operating the GPS receiver circuit 30 more strict when GPS satellite signal reception by the GPS receiver circuit 30 fails, the GPS receiver circuit 30 can be operated in an environment suited to GPS satellite signal reception. Whether or not the environment is suited to GPS satellite signal reception can therefore be accurately determined using the solar cell 22, and power consumption can be suppressed.

When the detection level remains less than the threshold level continuously for the generating state detection time or more, the control circuit 40 resets the threshold level to one level lower. Because the threshold level drops one level in this case, the detection level can more easily reach the threshold level. By thus relaxing the condition for operating the GPS receiver circuit 30, an opportunity for operating the GPS receiver circuit 30 can be created. Whether or not the environment is suited to GPS satellite signal reception can thus be accurately determined using the solar cell 22, and power consumption can be suppressed.

Because a standby mode is entered until the resume-control time of 12:00:00 the next day when this process of the control circuit 40 ends, the GPS receiver circuit 30 can be prevented from operating more than necessary. As a result, power consumption can be further suppressed.

The voltage detection circuit 44 detects the open circuit voltage of the solar cell 22 when the charging control switch 42 is open. As a result, the voltage detection circuit 44 is not affected by the storage battery 24, and the open circuit voltage of the solar cell 22 can be detected highly accurately. The open circuit voltage of the solar cell 22, that is illuminance on the solar cell 22, can therefore be detected with higher accuracy, and an indoor/outdoor determination using the solar cell 22 can be made with greater accuracy than when based on the voltage or charge state of the storage battery 24.

Furthermore, because reception occurs only when the voltage detection circuit 44 detects that the electronic device 100 is outdoors, the probability of successfully receiving a satellite signal in a short time can be improved, and the reception process can be performed efficiently. Performing the reception process when the electronic device 100 is indoors in an environment where satellite signals cannot be received can therefore be prevented, and wasteful power consumption can be prevented.

Furthermore, because the control circuit 40 operates the voltage detection circuit 44 only when a charge state is detected by the charge state detection circuit 43, the voltage detection circuit 44 is not operated when charging does not occur, that is, when light is not incident to the solar cell 22, and wasteful power consumption can be prevented.

Because the charge state detection process of the charge state detection circuit 43 is performed at 1-second intervals, and the generating state detection process of the voltage detection circuit 44 is executed only when the charge state detection circuit 43 determines that charging is in progress, the operating time of the voltage detection circuit 44, that is, the time that the charging control switch 42 is off, can be minimized. A drop in the charging efficiency of the solar cell 22 can therefore be suppressed.

Embodiment 2

A second embodiment of the invention is described next with reference to the accompanying figures.

Note that the configuration of an electronic device according to this embodiment of the invention is the same as the first embodiment, and detailed description thereof is thus omitted or simplified.

Figure 12:
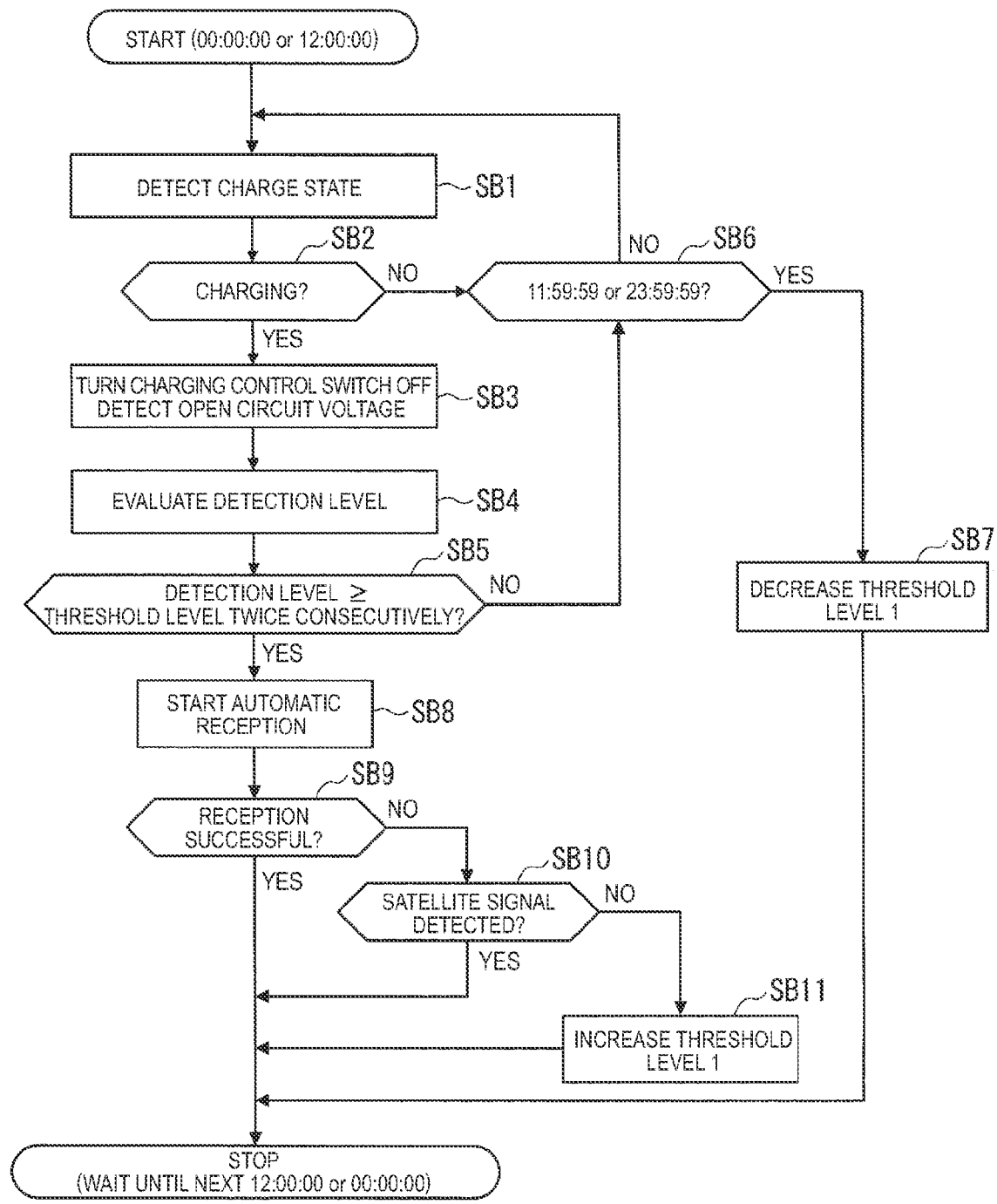
FIG. 12 is a flow chart of a process executed by the control circuit in a second embodiment of the invention.

FIG. 12 is a flow chart of a process of the control circuit in this second embodiment.

This embodiment differs from the first embodiment only in that (i) the control circuit 40 starts control daily at 12:00:00 and at 00:00:00, and (ii) when GPS satellite signal reception is determined to have failed in the reception process, the threshold level is reset after determining if a GPS satellite signal was detected by the GPS receiver circuit 30. Steps SB1 to SB9 of the control circuit are identical to steps SA1 to SA9 in the first embodiment.

In this embodiment of the invention the control circuit 40 is set to start control daily at 12:00:00 and at 00:00:00. The frequency at which the control circuit 40 starts reception control in the invention is thus not particularly limited. This frequency can therefore be set appropriately with consideration for power consumption, for example.

In addition, the control circuit 40 repeats the processes of steps SB1 to SB6, which are identical to the processes of SA1 to SA6 in the first embodiment, but the generating state detection time is set to 12:00.

In addition, when the process of the control circuit 40 ends, the process of SB1 starts again from the resume-control time, which is the next 12:00:00 or 00:00:00.

If GPS satellite signal reception fails in the reception process (SB9 returns No) in this embodiment, whether or not a GPS satellite signal was detected by the GPS receiver circuit 30 is determined (SB10).

If a GPS satellite signal is not detected by the GPS receiver circuit 30 (SB10 returns No), the threshold level is set one level higher (SB11), the process ends, and a standby mode is entered until the next 12:00:00 or 00:00:00, which is the resume-control time.

If it is determined that a GPS satellite signal was detected by the GPS receiver circuit 30 (SB10 returns Yes), the threshold level remains the same, the process ends, and a standby mode is entered until the next 12:00:00 or 00:00:00, which is the resume-control time. Note that if the reception level of the GPS satellite signal is greater than or equal to a specific level, it is determined that a GPS satellite signal was detected. It is determined that a GPS satellite signal was detected if a GPS satellite signal can be detected from at least one satellite, but the number of satellites required to determine that a GPS satellite signal was detected is not specifically limited.

In addition to the effect of the first embodiment, this second embodiment of the invention also has the following effect.

By setting the resume-control time twice daily at 12:00:00 and 00:00:00, the threshold value can be optimized more quickly than once daily.

If a GPS satellite signal was detected but reception of a GPS satellite signal by the reception process failed, the possibility is high that reception failed for some other reason such as entering the shadow of a building immediately after the reception process started, and the possibility that the environment was suited to GPS satellite signal reception is high. The control circuit 40 therefore determines there is no need to change the threshold level if a GPS satellite signal was detected even if GPS satellite signal reception failed. The threshold level is therefore set to one higher level only when a GPS satellite signal is not detected by the GPS receiver circuit 30. This enables more accurately detecting whether or not the environment is suited to satellite signal reception.

Embodiment 3

A third embodiment of the invention is described next with reference to the accompanying figures.

Note that the configuration of an electronic device according to this embodiment of the invention is the same as the first embodiment, and detailed description thereof is thus omitted or simplified.

Figure 13:
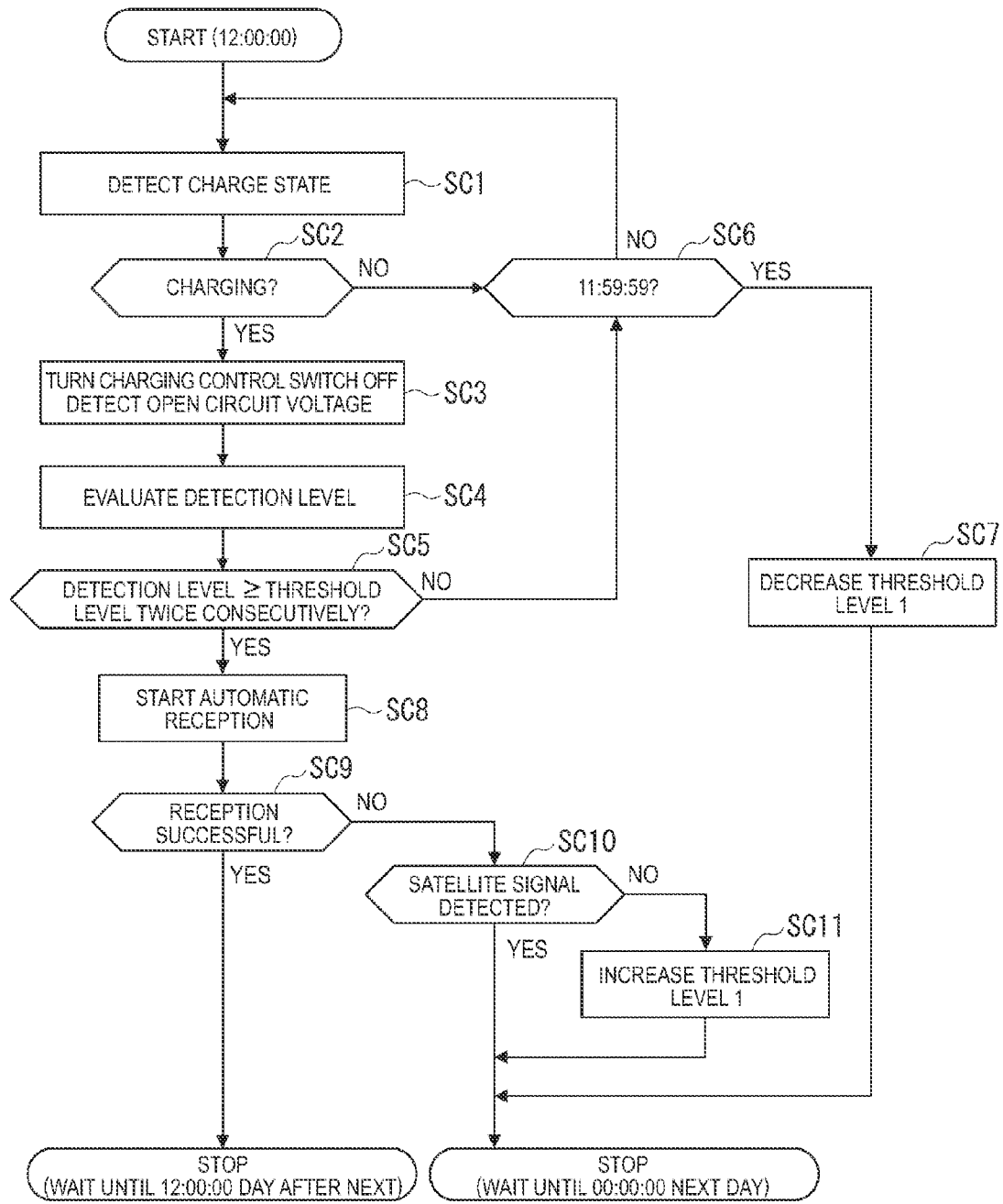
FIG. 13 is a flow chart of a process executed by the control circuit in a third embodiment of the invention.

FIG. 13 is a flow chart of a process of the control circuit in this third embodiment.

This embodiment differs from the first embodiment only in that (i) when GPS satellite signal reception is determined to have failed in the reception process, the threshold level is reset after determining if a GPS satellite signal was detected by the GPS receiver circuit 30, and (ii) when the GPS satellite signal reception process is performed at a specific time interval, the time interval when the GPS receiver circuit 30 succeeds in receiving a GPS satellite signal is a first time interval, the time interval when the GPS receiver circuit 30 fails in receiving a GPS satellite signal is a second time interval, and the first time interval is longer than the second time interval. Steps SC1 to SC9 of the control circuit are identical to steps SA1 to SA9 in the first embodiment.

When GPS satellite signal reception by the reception process is determined to have failed (SC9 returns No) in this embodiment, the threshold level is reset after determining if a GPS satellite signal was detected by the GPS receiver circuit 30 (SC10), but steps SC10 and SC11 of this control circuit are the same as SB10 and SB11 in the second embodiment.

When GPS satellite signal reception by the reception process is determined to have succeeded (SC9 returns Yes) in this embodiment, the process ends and a standby mode is entered until 12:00:00 the day after next, which is the resume-control time. Conversely, when GPS satellite signal reception by the reception process is determined to have failed (SC9 returns No), or when Yes is returned by SC6, the process ends after SC7, SC10, or SB11, and a standby mode is entered until 12:00:00 the day after next, which is the resume-control time. When the GPS satellite signal reception process is executed at a specific time interval, a first time interval that is used when GPS satellite signal reception succeeded is longer than the second time interval when reception failed.

When the satellite signal receiving device is incorporated in a quartz timepiece as the electronic device 100 and time information is adjusted by receiving a GPS satellite signal, the time accuracy of the electronic device can be sufficiently maintained for several days by the time precision of the quartz timepiece after the time has been adjusted by receiving a GPS satellite signal. The need to receive a satellite signal is therefore reduced for awhile. However, when satellite signal reception by the reception process fails, the need to receive a satellite signal without waiting increases.

This embodiment therefore sets the first time interval when GPS satellite signal reception succeeds longer than the second time interval when reception fails. This increases the time until a GPS satellite signal is received next when GPS satellite signal reception succeeded, prevents operating the receiver circuit more than necessary, and further reduces power consumption.

Embodiment 4

A fourth embodiment of the invention is described next with reference to the accompanying figures.

Note that the configuration of an electronic device according to this embodiment of the invention is the same as the first embodiment, and detailed description thereof is thus omitted or simplified.

Figure 14:
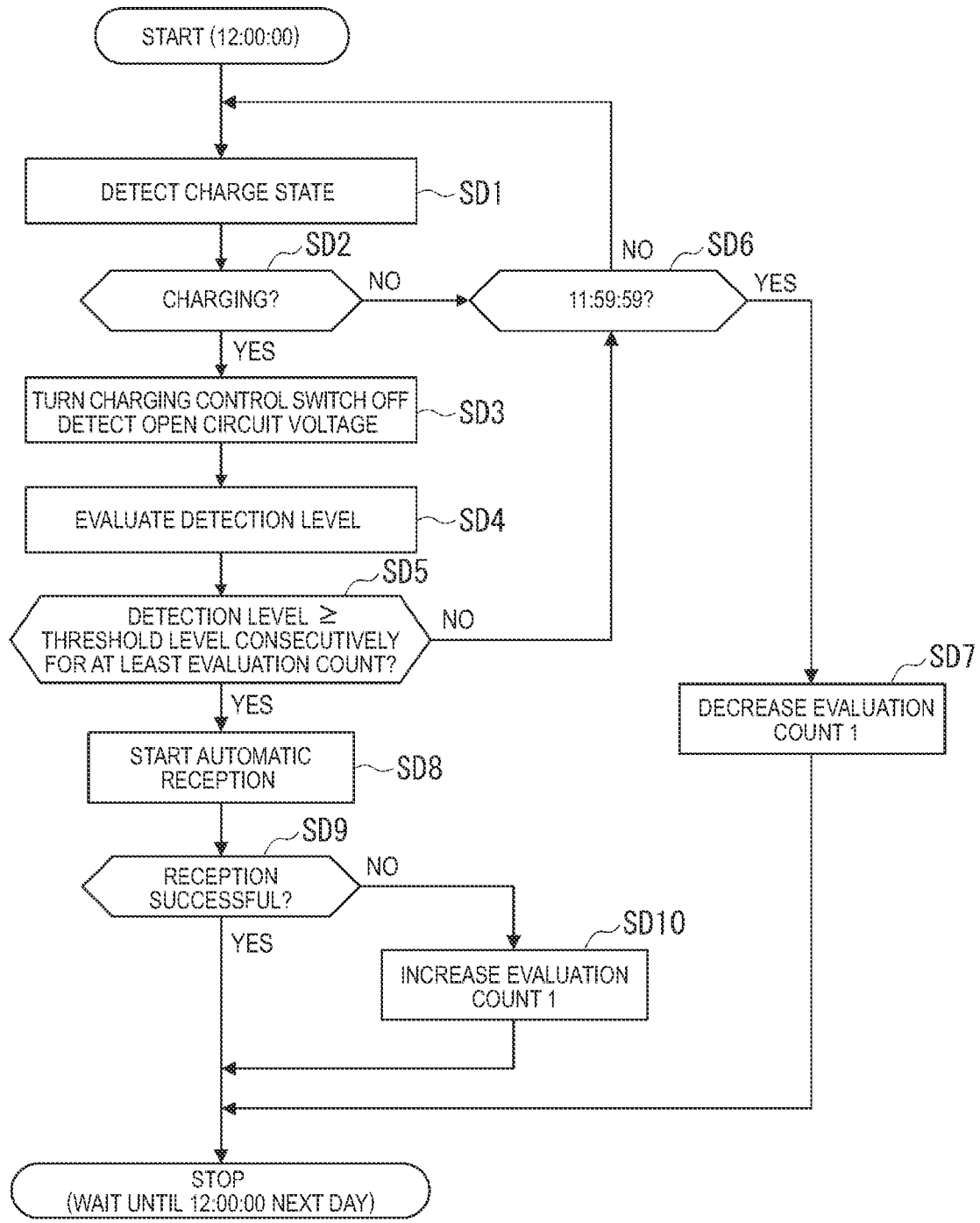
FIG. 14 is a flow chart of a process executed by the control circuit in a fourth embodiment of the invention.

FIG. 14 is a flow chart of a process of the control circuit in this fourth embodiment.

This embodiment differs from the first embodiment only in that (i) the detection value is a power generating evaluation time, which is the time the solar cell output is continuously greater than or equal to a specific value, and the threshold value is this power generating evaluation time. More specifically, this embodiment mainly differs from the first embodiment in that the process of SD5 is substituted for the process of SA5. Steps SD1 to SD4, SD6, SD8, and SD9 of the control circuit are identical to steps SA1 to SA4, SA6, SA8, and SA9 in the first embodiment.

In this embodiment the control circuit 40 determines based on voltage detection at a 1-second interval if the detection level is continuously greater than or equal to a threshold level for an evaluation count (such as 10 times) or more (SD5). This evaluation count is preset. When the open circuit voltage is detected at a 1-second interval, the relationship between the evaluation count and the power generating evaluation time is as shown in FIG. 15. For example, if the evaluation count is 5, the power generating evaluation time is 5 seconds, and if the evaluation count is 10, the power generating evaluation time is 10 seconds. There is therefore a correlation between the evaluation count and the power generating evaluation time insofar as the voltage detection interval is constant. However, the relationship between the evaluation count and power generating evaluation time is not limited to the relationship shown in FIG. 15, and varies according to the voltage detection interval. For example, when the open circuit voltage is detected at a 2-second interval, the power generating evaluation time is 10 seconds if the evaluation count is 5. In addition, the evaluation count increases and decreases as described below, but the initial evaluation count is 10 (the power generating evaluation time is 10 seconds) in this embodiment of the invention.

When SD5 returns No, the control circuit 40 can determine that the possibility is high that the electronic device 100 is not in an environment suited to GPS satellite signal reception.

More specifically, if the electronic device 100 is outdoors during the day, light exceeding the threshold level should be continuously incident on the solar cell 22 for the power generating evaluation time. Therefore, when the open circuit voltage is detected at a 1-second interval, an open circuit voltage equal to or exceeding the threshold level is detected continuously for the evaluation count or more.

However, if an open circuit voltage equal to or exceeding the threshold level cannot be detected continuously for the evaluation count or more, the shadow of a building may have been entered while moving in a vehicle, for example. The likelihood of failing at GPS satellite signal reception increases under this condition.

However, if SD6 returns Yes, the evaluation count is reset to one level lower (SD7), the process ends, and a standby state is entered for a resume-control time at which the control circuit 40 next starts the process. The resume-control time in this embodiment of the invention is one second later at 12:00:00. By thus resetting the evaluation count to one level lower when a state in which the detection level is less than the evaluation count continues for a generating state detection time or longer, the detection level can more easily equal or exceed the evaluation count. An opportunity to operate the GPS receiver circuit 30 can thus be provided by relaxing the condition for operating the GPS receiver circuit 30.

However, if GPS satellite signal reception failed in the reception process (SD9 returns No), the evaluation count is reset to one level higher (SD10), the process ends, and a standby state is entered until the resume-control time of 12:00:00 the next day. Increasing the evaluation count one level makes it more difficult for the detection level to equal or exceed the evaluation count when the process of SD1 restarts from 12:00:00 the next day. By thus making the condition for operating the GPS receiver circuit 30 more strict, the GPS receiver circuit 30 can be operated in an environment suited to receiving GPS satellite signals.

In addition to the foregoing effect of the first embodiment, the following effect is also achieved by the fourth embodiment.

Increasing the evaluation count by one makes it more difficult for the detection level to continuously equal or exceed the threshold level for greater than or equal to the evaluation count. By thus making the condition for operating the GPS receiver circuit 30 more strict when GPS satellite signal reception by the GPS receiver circuit 30 fails, the GPS receiver circuit 30 can be operated in an environment suited to GPS satellite signal reception. Whether or not the environment is suited to GPS satellite signal reception can therefore be accurately determined using the solar cell 22, and power consumption can be suppressed.

Embodiment 5

A fifth embodiment of the invention is described next with reference to the accompanying figures.

Note that the configuration of an electronic device according to this embodiment of the invention is the same as the first embodiment, and detailed description thereof is thus omitted or simplified.

Figure 16:
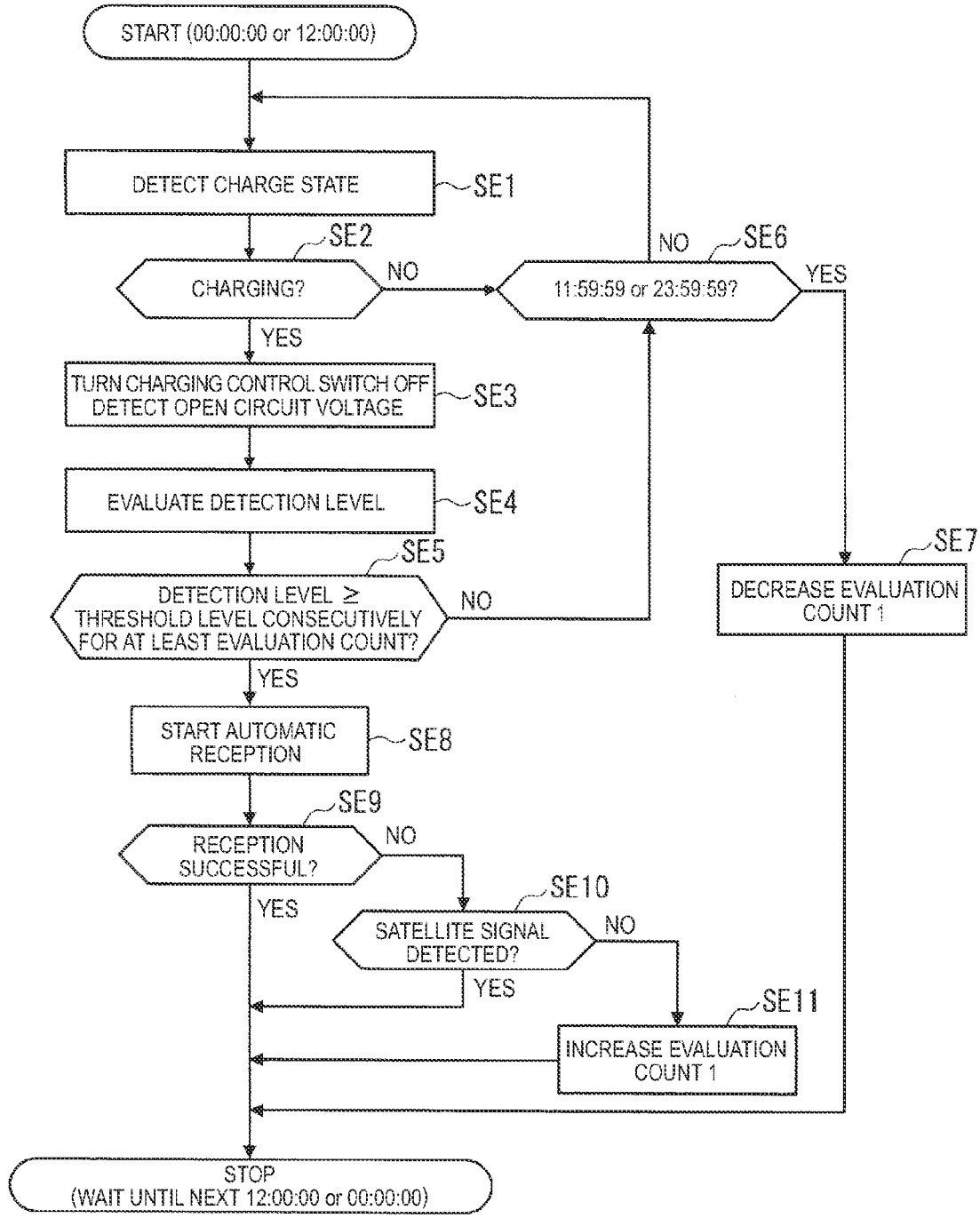
FIG. 16 is a flow chart of a process executed by the control circuit in a fifth embodiment of the invention.

FIG. 16 is a flow chart of a process of the control circuit in this fifth embodiment.

This embodiment differs from the fourth embodiment only in that (i) the control circuit 40 starts control daily at 12:00:00 and at 00:00:00, and (ii) when GPS satellite signal reception is determined to have failed in the reception process, the threshold level is reset after determining if a GPS satellite signal was detected by the GPS receiver circuit 30. Steps SE1 to SE9 of the control circuit are identical to steps SD1 to SD9 in the fourth embodiment.

Steps SE10 and SE11 of the control circuit are also identical to steps SB10 and SB11 in the second embodiment.

This fifth embodiment has the same effects as the first embodiment, second embodiment, and fourth embodiment.

Embodiment 6

A sixth embodiment of the invention is described next with reference to the accompanying figures.

Note that the configuration of an electronic device according to this embodiment of the invention is the same as the first embodiment, and detailed description thereof is thus omitted or simplified.

Figure 17:
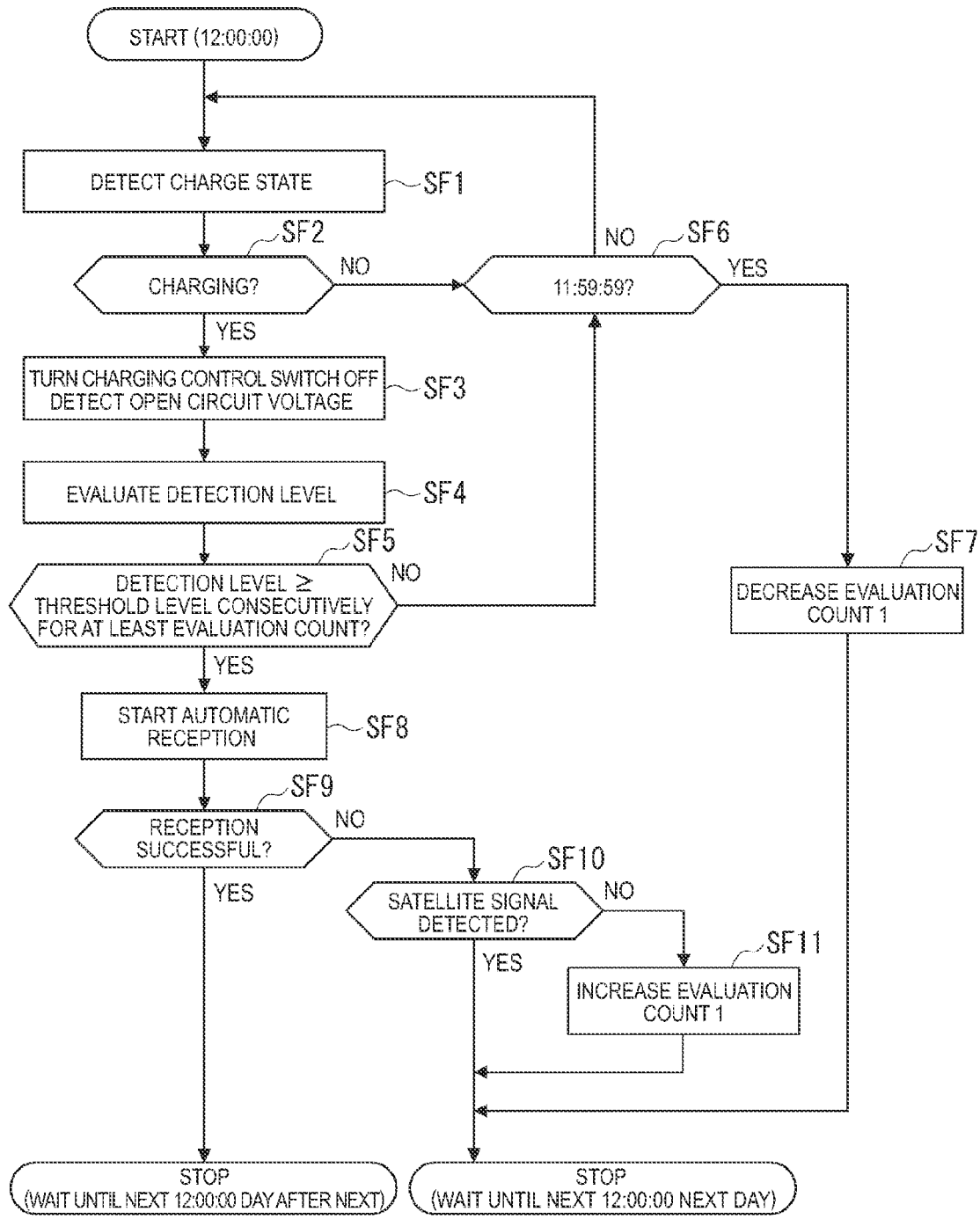
FIG. 17 is a flow chart of a process executed by the control circuit in a sixth embodiment of the invention.

FIG. 17 is a flow chart of a process of the control circuit in this sixth embodiment.

This embodiment differs from the fourth embodiment only in that (i) when GPS satellite signal reception is determined to have failed in the reception process, the threshold level is reset after determining if a GPS satellite signal was detected by the GPS receiver circuit 30, and (ii) when the GPS satellite signal reception process is performed at a specific time interval, the time interval when the GPS receiver circuit 30 succeeds in receiving a GPS satellite signal is a first time interval, the time interval when the GPS receiver circuit 30 fails in receiving a GPS satellite signal is a second time interval, and the first time interval is longer than the second time interval. Steps SF1 to SF8 of the control circuit are identical to steps SD1 to SD8 in the first embodiment.

Steps SF9 to SF11 of the control circuit are also identical to steps SC9 to SC11 in the third embodiment.

This sixth embodiment has the same effects as the first embodiment, third embodiment, and fourth embodiment.

Other Embodiments

The invention is not limited to the embodiments described above and can be varied in many ways without departing from the scope of the invention.

For example, the control circuit 40 changes the threshold value when a specific condition is met in the foregoing embodiments. However, the control circuit 40 could be limited to resetting the threshold value higher. This reduces the possibility of executing the reception process in the same environment as when satellite signal reception failed, and can at least prevent the receiver circuit from operating uselessly. The control circuit 40 could also be limited to resetting the threshold value lower. Because the threshold value decreases in this case, the detection value that is detected by the generating state detection circuit can more easily equal or exceed the threshold value. In addition, by relaxing the condition for operating the receiver circuit, an opportunity for operating at least the receiver circuit can be created.

The control circuit 40 controls the threshold value in the foregoing embodiments, but the threshold value could also be changed manually by operating a button, for example.

The charge state is detected at a 1-second interval in the foregoing embodiments, but the interval is not so limited and could be set to a 0.5-second interval, 10-second interval, or 1-minute interval, for example.

The automatic reception process receives in the timekeeping mode, and reception in the positioning mode only occurs when the reception process is manually invoked in the foregoing embodiments, but the automatic reception process could obviously be configured to receive in the positioning mode. For example, a configuration that enables the user to preselect the reception mode used in the automatic reception process, receives in the positioning mode during the automatic reception process when the positioning mode is selected, and receives in the timekeeping mode during the automatic reception process when the timekeeping mode is selected, is also conceivable.

The control circuit 40 resets the threshold value to a lower value when a specific condition is met in the foregoing embodiments. When the threshold value is reset to a lower value plural times consecutively in this case, the control circuit 40 preferably sets the GPS receiver circuit 30, charging control switch 42, and voltage detection circuit 44 to a sleep mode, detects a transition from the sleep mode to the normal mode, and resets the threshold value to the default value when the GPS receiver circuit 30, charging control switch 42, and voltage detection circuit 44 change from the sleep mode to the normal mode. Change from the sleep mode to the normal mode could occur when a button is operated to cancel the sleep mode, or when incidence of light greater than or equal to a specific illuminance level is detected on the solar cell 22, for example.

For example, when the electronic device 100 having a satellite signal receiving device is stored in a location shielded from light, the control circuit 40 resets the threshold value to a lower level plural times consecutively. Because there is no use operating the GPS receiver circuit 30 and generating state detection circuit in this case, power consumption can be reduced by entering the sleep mode, that is, a state in which operation stops.

The sleep mode can be cancelled by the user operating a button, for example. Because the threshold value will be too low if it remains the same as before the sleep mode was entered in this case, operating the GPS receiver circuit 30 will be useless. However, by thus resetting the threshold value to the default value when changing from the sleep mode to the normal mode, the receiver circuit can be prevented from operating more than necessary as a result of the threshold value being too low. Power consumption can thus be further suppressed.

The foregoing embodiments enter a standby mode until the resume-control time when processing by the control circuit 40 ends, but processing by the control circuit 40 could restart without entering the standby mode. In this case the control circuit 40 preferably operates the GPS receiver circuit 30 only when the time passed from the end of GPS receiver circuit 30 operation is greater than or equal to a set reception interval time that is set as the interval for operating the GPS receiver circuit 30, and the detection value detected by the generating state detection circuit is greater than or equal to a threshold value.

The receiver circuit can be prevented from operating more than necessary by thus preventing the GPS receiver circuit 30 from operating when the time passed from when GPS receiver circuit 30 operation ends is not greater than or equal to the set reception interval time. Power consumption can thus be further reduced.

The control circuit 40 resets the threshold value to a higher level when satellite signal reception by the GPS receiver circuit 30 fails once in the foregoing embodiments, but the control circuit 40 could be configured to reset the threshold value higher only when satellite signal reception by the GPS receiver circuit 30 fails plural times consecutively.

Because the electronic device 100 is determined to be in an environment in which the GPS receiver circuit 30 cannot receive satellite signals and resets the threshold value higher when satellite signal reception by the GPS receiver circuit 30 fails plural times consecutively in this case, the threshold value can be prevented from becoming higher than necessary due to some other reason such as entering the shadow of a building while moving in a vehicle. Whether or not the environment is suited to satellite signal reception can thus be determined more accurately.

The second embodiment, third embodiment, fifth embodiment, and sixth embodiment determine that a GPS satellite signal was detected if there is at least one satellite from which a GPS satellite signal can be detected, but the number of satellites required to determine that a GPS satellite signal was detected is not specifically limited. For example, the number of satellites required to determine that a GPS satellite signal was detected could be one in the timekeeping mode and three in the positioning mode.

While time information can be received from the GPS satellite signal if there is at least one satellite from which a GPS satellite signal can be detected in the timekeeping mode, the position of the electronic device cannot be determined in the positioning mode based on positioning information from GPS satellite signals if GPS satellite signals cannot be detected from three or more satellites. The above configuration thus enables accurately determining if the environment is suited to GPS satellite signal reception.

The control circuit 40 changes the threshold value when a specific condition is met in the foregoing embodiments, but the specific condition is not limited to the conditions described above.

For example, the threshold value could be reset to a higher value when satellite signals are continuously received successfully. Continuously receiving satellite signals successfully means the likelihood is high that the electronic device 100 is being used in an environment where satellite signals can be received quite easily. Battery life can be prioritized in this case by increasing the threshold value and limiting the number of times signals are received.

A configuration that resets the threshold value higher when changing from the timekeeping mode to the positioning mode, and resets the threshold value lower when changing from the positioning mode to the timekeeping mode, is also conceivable. Compared with the timekeeping mode, the positioning mode requires an environment in which GPS satellite signals can be easily received. This configuration therefore enables accurately determining if the environment is suited to GPS satellite signal reception.

From the same perspective, the threshold values could be managed separately in the timekeeping mode and the positioning mode.

The generating state detection circuit in the foregoing embodiments detects a detection value that increases as the illuminance of light on the solar cell 22 increases, but the detection value is not limited to a value that increases as the illuminance of light on the solar cell 22 increases. More specifically, the detection value could be a value that decreases as the illuminance of light on the solar cell 22 increases. An example of a case in which the detection value decreases as the illuminance of light on the solar cell 22 increases is use in a device in which the open circuit voltage decreases as the illuminance of light on the solar cell 22 increases.

An electronic device 100 having a satellite signal receiving device according to the invention is not limited to a wristwatch (electronic timepiece), and the invention can be used in a wide range of devices that are driven by a storage battery and receive satellite signals sent from positioning information satellites, including cellular phones and mobile GPS receivers used in mountain climbing, for example.

Furthermore, by using a solar cell 22, storage battery 24, charging control switch 42, and voltage detection circuit 44, the invention can highly accurately detect the illuminance of light incident to the solar cell 22. The illuminance detection mechanism thus rendered is also not limited to use only in satellite signal receiving devices, and can be used in other devices. The invention is particularly suited to devices that start some other device based on illuminance detection. For example, the invention can be applied in devices that turn lights on/off or adjust the brightness of lighting according to the detected illuminance, and in long-wave radio-controlled timepieces that start reception according to the illuminance.

What is claimed is:

1. A satellite signal receiving device having a receiver circuit that receives a satellite signal transmitted from a positioning information satellite, comprising:
   a solar cell that converts light energy to electrical energy;
   a generating state detection circuit that detects a generating state of the solar cell to obtain a detection value, which is representative of an illuminance of the solar cell; and
   a control circuit that controls the receiver circuit and the generating state detection circuit,
      sets a threshold value indicative of a preset illuminance threshold level for determining if the solar cell is in a high illuminance state that is greater than or equal to the threshold value, or in a low illuminance state that is lower than the threshold value,
      compares the detection value detected by the generating state detection circuit with the threshold value and operates the receiver circuit if and when it is determined that the solar cell is in the high illuminance state, and
      changes the threshold value to a higher value indicative of a higher illuminance threshold level if reception of the satellite signal by the receiver circuit fails.

2. A satellite signal receiving device comprising:
   a receiver circuit that executes a receiving process which has a searching process for a positioning information satellite and a detecting process for a satellite signal;
   a solar cell that converts light energy to electrical energy;
   a generating state detection circuit that detects a generating state of the solar cell to obtain a detection value, which is representative of an illuminance of the solar cell; and
   a control circuit that controls the receiver circuit and the generating state detection circuit,
      sets a threshold value indicative of a preset illuminance threshold level for determining if the solar cell is in a high illuminance state that is greater than or equal to the threshold value, or in a low illuminance state that is lower than the threshold value,
      compares the detection value detected by the generating state detection circuit with the threshold value and operates the receiver circuit if and when it is determined that the solar cell is in the high illuminance state, and
      changes the threshold value to a higher value indicative of a higher illuminance threshold level when the receiver circuit searches the positioning information satellite and does not detect the satellite signal, and
      retains the threshold value when the satellite signal is detected by the receiver circuit but reception of the satellite signal fails.

3. The satellite signal receiving device described in claim 1, wherein:
   when the low illuminance state detected based on the detection value detected by the generating state detection circuit continues for a preset generating state detection time or longer, the control circuit changes the threshold value so that the illuminance threshold level decreases.

4. The satellite signal receiving device described in claim 3, wherein:
   when the control circuit changes the threshold value so that the illuminance threshold level decreases, plural times consecutively, the control circuit moves the receiver circuit and the generating state detection circuit to a sleep mode, and
   resets the threshold value to a default value when a state changing from the sleep mode to a normal mode is detected, and the receiver circuit and the generating state detection circuit change from the sleep mode to the normal mode.

5. The satellite signal receiving device described in claim 1, wherein:
the control circuit executes the satellite signal reception process at a specific time interval between consecutive satellite signal receiving operations,
when the receiver circuit successfully receives the satellite signal, the control circuit executes a next satellite signal reception process after a first time interval, and
when the receiver circuit fails to receive the satellite signal, the control circuit executes the next satellite signal reception process after a second time interval,
the first time interval being longer than the second time interval.

6. The satellite signal receiving device described in claim 1, wherein:
the control circuit changes the threshold value when reception of the satellite signal by the receiver circuit fails plural times consecutively.

7. A satellite signal receiving device having a receiver circuit that receives a satellite signal transmitted from a positioning information satellite, comprising:
a solar cell that converts light energy to electrical energy;
a generating state detection circuit that detects the generating state of the solar cell to obtain a detection value, which is representative of an illuminance of the solar cell; and
a control circuit that controls the receiver circuit and the generating state detection circuit,
sets a threshold value for determining if the solar cell is in a high illuminance state that is greater than or equal to a preset illuminance threshold level, or in a low illuminance state that is lower than the illuminance threshold level,
compares the detection value detected by the generating state detection circuit with the threshold value and operates the receiver circuit if and when it is determined that the solar cell is in the high illuminance state, and
changes the threshold value to a lower value indicative of a lower illuminance threshold level when the solar cell is in the low illuminance state for a preset generating state detection time or longer.

8. The satellite signal receiving device described in claim 7, wherein:
when the control circuit changes the threshold value so that the illuminance threshold level decreases plural times consecutively, the control circuit moves the receiver circuit and the generating state detection circuit to a sleep mode, and
resets the threshold value to a default value when a state changing from the sleep mode to a normal mode is detected, and the receiver circuit and the generating state detection circuit change from the sleep mode to the normal mode.

9. The satellite signal receiving device described in claim 7, wherein:
the control circuit executes the satellite signal reception process at a specific time interval between consecutive satellite signal receiving operations,
when the receiver circuit successfully receives the satellite signal, the control circuit executes a next satellite signal reception process after a first time interval, and
when the receiver circuit fails to receive the satellite signal, the control circuit executes the next satellite signal reception process after a second time interval,
the first time interval being longer than the second time interval.

10. A method of controlling a satellite signal receiving device that has a receiver circuit that receives a satellite signal transmitted from a positioning information satellite,
a solar cell that converts light energy to electrical energy, and
a generating state detection circuit that detects a generating state of the solar cell to obtain a detection value, which is representative of an illuminance of the solar cell, comprising steps of:
setting a threshold value for determining if the solar cell is in a high illuminance state that is greater than or equal to a preset illuminance threshold level, or in a low illuminance state that is lower than the illuminance threshold level;
comparing the detection value detected by the generating state detection circuit with the threshold value and operating the receiver circuit if and when it is determined that the solar cell is in the high illuminance state; and
changing the threshold value to a higher value indicative of a higher illuminance threshold level when reception of the satellite signal by the receiver circuit fails.

11. A method of controlling a satellite signal receiving device that has a receiver circuit that receives a satellite signal transmitted from a positioning information satellite, the method comprising:
a solar cell that converts light energy to electrical energy, and
a generating state detection circuit that detects a generating state of the solar cell to obtain a detection value, which is representative of an illuminance of the solar cell, comprising steps of:
setting a threshold value indicative of a preset illuminance threshold level for determining if the solar cell is in a high illuminance state that is greater than or equal to the threshold value, or in a low illuminance state that is lower than the threshold value;
comparing the detection value detected by the generating state detection circuit with the threshold value and operating the receiver circuit if and when a high illuminance state is determined; and
changing the threshold value to a lower value indicative of a lower illuminance level when the solar cell is in low illuminance state for a preset generating state detection time or longer.

12. An electronic device comprising the satellite signal receiving device described in claim 1.

13. An electronic device comprising the satellite signal receiving device described in claim 7.

* * * * *